US012420219B2

(12) United States Patent
Scott et al.

(10) Patent No.: US 12,420,219 B2
(45) Date of Patent: *Sep. 23, 2025

(54) STORMWATER TREATMENT DEVICE

(71) Applicant: CONTECH ENGINEERED SOLUTIONS LLC, West Chester, OH (US)

(72) Inventors: Jordan Douglas Scott, Vancouver, WA (US); Mathew Edward Bauer, Gresham, OR (US); Michael Benjamin Brooks, Battle Ground, WA (US); Lindsey Blaire, Portland, OR (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 317 days.

This patent is subject to a terminal disclaimer.

(21) Appl. No.: 18/170,378

(22) Filed: Feb. 16, 2023

(65) Prior Publication Data
US 2023/0219021 A1    Jul. 13, 2023

Related U.S. Application Data

(63) Continuation-in-part of application No. 17/397,252, filed on Aug. 9, 2021, now Pat. No. 11,713,569.
(Continued)

(51) Int. Cl.
*B01D 33/11* (2006.01)
*B01D 33/76* (2006.01)
(Continued)

(52) U.S. Cl.
CPC ............. *B01D 33/11* (2013.01); *B01D 33/76* (2013.01); *B01D 33/801* (2013.01); *C02F 1/001* (2013.01);
(Continued)

(58) Field of Classification Search
None
See application file for complete search history.

(56) References Cited

U.S. PATENT DOCUMENTS 3,936,378 A    2/1976   Kawada
5,685,983 A    11/1997  Frykhult
(Continued)

FOREIGN PATENT DOCUMENTS

CN         2918569 Y      7/2007
DE    102005019001 A1    10/2006
(Continued)

OTHER PUBLICATIONS

PCT, International Search Report and Written Opinion, International Application No. PCT/US2021/45199; date of mailing Nov. 30, 2021, 13 pages.

*Primary Examiner* — Chester T Barry
(74) *Attorney, Agent, or Firm* — THOMPSON HINE LLP

(57) ABSTRACT

A stormwater treatment device includes a tank defining an internal volume and having an inlet and an outlet, a rotatable screen unit mounted within the tank, the rotatable screen unit defining a through path with an inlet end and an outlet end. The rotatable screen unit includes a screen structure with a plurality of screening openings for allowing passage of at least some stormwater from the through path outwardly through the screen structure while inhibiting passage of at least some trash items through the screen structure such that the trash items move along the through path from the inlet end to the outlet end. The stormwater treatment device may include both a normal treatment flow path and one or more bypass treatment flow paths.

19 Claims, 26 Drawing Sheets

Related U.S. Application Data

(60) Provisional application No. 63/064,651, filed on Aug. 12, 2020.

(51) Int. Cl.
    *B01D 33/80*     (2006.01)
    *C02F 1/00*     (2023.01)
    *C02F 103/00*     (2006.01)

(52) U.S. Cl.
    CPC .. *C02F 2103/001* (2013.01); *C02F 2301/043* (2013.01)

(56) References Cited

U.S. PATENT DOCUMENTS

| | | |
|---|---|---|
| 6,868,973 B1 | 3/2005 | Kamo |
| 7,527,731 B2 | 5/2009 | Su |
| 10,309,089 B2 | 6/2019 | Babcanec |
| 10,344,466 B2 | 7/2019 | Kent |
| 11,713,569 B2 * | 8/2023 | Scott ................. B01D 21/0012 210/170.03 |
| 2003/0034286 A1 | 2/2003 | Butler |
| 2004/0262204 A1 | 12/2004 | Buckett |
| 2012/0255896 A1 | 10/2012 | Courtemanche |
| 2015/0174512 A1 | 6/2015 | Kluit |

FOREIGN PATENT DOCUMENTS

| | | |
|---|---|---|
| JP | 4401969 | 1/2010 |
| KR | 101304128 | 9/2013 |
| KR | 101867483 | 6/2018 |
| WO | WO 9627422 A1 | 9/1996 |

\* cited by examiner

STORMWATER TREATMENT DEVICE

CROSS REFERENCE TO RELATED APPLICATIONS

This application is a continuation-in-part of application Ser. No. 17/397,252, filed on Aug. 9, 2021, now U.S. Pat. No. 11,713,569.

TECHNICAL FIELD

This application relates generally to stormwater treatment devices that receive stormwater runoff, and, more particularly, to a stormwater treatment device with enhanced floatables and/or debris removal and retention.

BACKGROUND

The protection of ground water and natural bodies of water requires systems for diverting and/or treating water that contacts roadways, parking lots, and other man-made structures. A variety of stormwater treatments systems exist.

Current stormwater trash capture products use direct screening techniques which clog very easily and have low treatment capacities. As most such systems fill with trash, treatment capacity diminishes, and the only solution is to repeatedly clear the screen via cumbersome maintenance.

Accordingly, it would be desirable to provide a stormwater treatment device with a screening feature that is less likely to clog.

SUMMARY

In one aspect, a stormwater treatment device includes a tank defining an internal volume and having an inlet and an outlet, and a rotatable screen unit mounted within the tank. The rotatable screen unit defines a through path with an inlet end and an outlet end, the rotatable screen unit includes a screen structure with a plurality of screening openings for allowing passage of at least some stormwater from the through path outwardly through the screen structure while inhibiting passage of at least some trash items through the screen structure such that the trash items move along the through path from the inlet end to the outlet end, wherein the rotatable screen unit includes a plurality of external drive paddles that rotate with the screen structure. The stormwater treatment device includes a normal treatment flow path configured to permit at least some stormwater that enters the tank through the inlet of the tank to flow into the inlet end of the rotatable screen unit and through the screening openings to reach the outlet of the tank. The stormwater treatment device also includes a bypass treatment flow path configured to permit at least some stormwater that enters the tank through the inlet of the tank to bypass the inlet end of the rotatable screen unit and interact with one or more of the external drive paddles to drive rotation of the screen structure before the water moves to the outlet of the tank.

In another aspect, a method of treating stormwater involves: flowing stormwater into an inlet of a tank in which a rotatable screen unit is located, the rotatable screen unit shaped to define a through path with an inlet end and an outlet end, the rotatable screen unit having a plurality of screening openings for allowing passage of stormwater therethrough to reach an outlet of the tank while preventing passage of at least some trash items through the screening openings; and, when an elevation of stormwater in the tank reaches a bypass height, flowing at least some stormwater along a bypass flow path that bypasses the inlet end of the rotatable screen unit and directs the stormwater to interact with one or more external drive paddles associated with the rotatable screen unit to drive rotation of the rotatable screen unit before the stormwater moves to the outlet of the tank.

In a further aspect, a stormwater treatment device includes a tank defining an internal volume and having an inlet and an outlet. A rotatable screen unit is mounted within the tank, the rotatable screen unit being barrel-shaped to define a through path with an inlet end and an outlet end, the rotatable screen unit having a plurality of screening openings for allowing passage of water therethrough while preventing passage of trash items. The rotatable screen unit is configured to be rotatably driven by water flow through the treatment device.

In another aspect, a stormwater treatment device includes a tank defining an internal volume and having an inlet and an outlet, with a rotatable screen unit mounted within the tank, the rotatable screen unit being barrel-shaped to define a through path with an inlet end and an outlet end. The rotatable screen unit includes a screen structure with a plurality of screening openings for allowing passage of at least some water from the through path outwardly through the screen structure while inhibiting passage of trash items through the screen structure such that trash items move along the through path from the inlet end to the outlet end. The rotatable screen unit includes a plurality of external drive paddles that rotate with the screen structure and that drive rotation of the screen structure by interacting with water that has been screened by passing outwardly through the screen structure.

In a further aspect, a stormwater treatment device includes a tank defining an internal volume and having an inlet and an outlet, with a rotatable screen unit mounted within the tank, the rotatable screen unit being barrel-shaped to define a through path with an inlet end and an outlet end, the rotatable screen unit having a plurality of screening openings for allowing passage of water therethrough while preventing passage of trash items through the screening openings so that trash items within the through path move from the inlet end to the outlet end. The rotatable screen unit has a rotation axis that runs transverse to an inlet flow direction of water entering the inlet.

In still another aspect, a method of treating stormwater involves: flowing stormwater into a tank in which a rotatable screen unit is located, the rotatable screen unit shaped to define an axial through path with an inlet end and an outlet end, the rotatable screen unit having a plurality of screening openings for allowing passage of water therethrough while preventing passage of trash items through the screening openings; and flowing the stormwater into the inlet end of the rotatable screen unit, wherein at least some stormwater passes through the screening openings for screening and interacts with externally located drive blades of the rotatable screen unit to drive rotation of the rotatable screen unit.

The details of one or more embodiments are set forth in the accompanying drawings and the description below. Other features, objects, and advantages will be apparent from the description and drawings, and from the claims.

DETAILED DESCRIPTION

Figure 1:
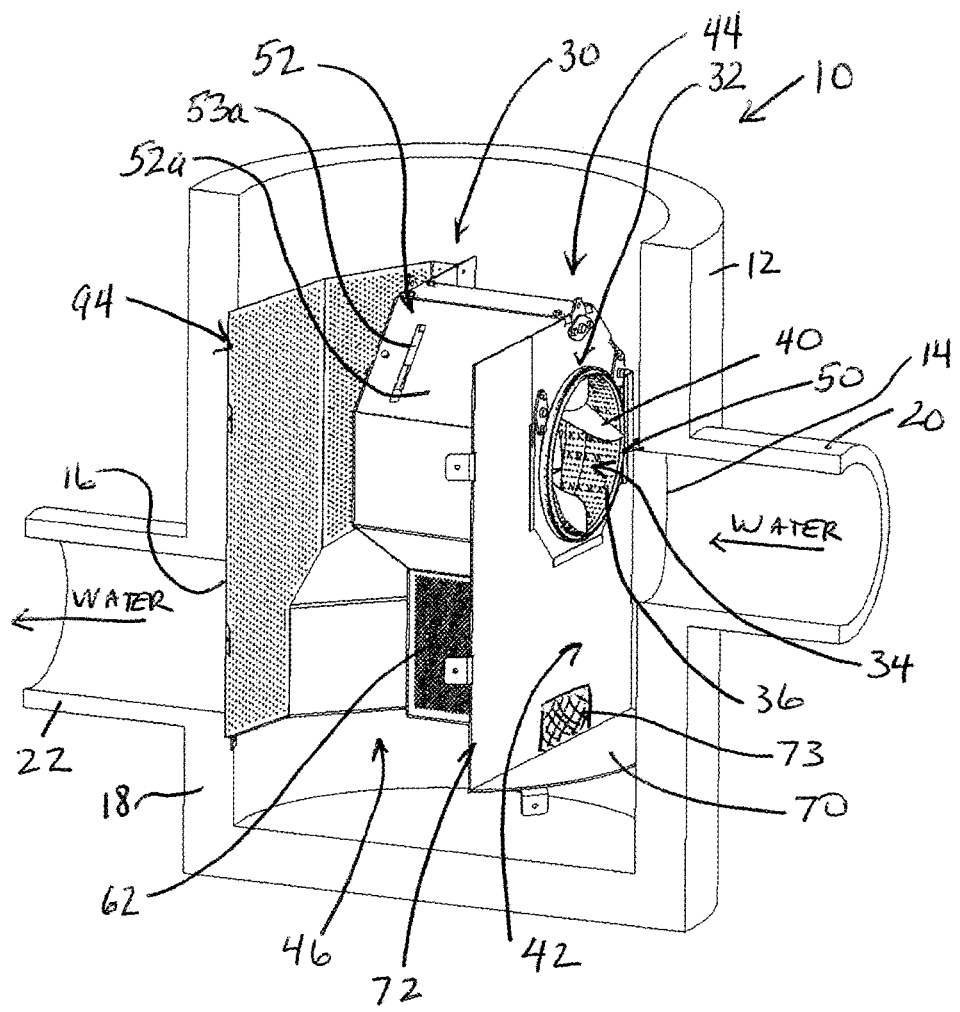
FIGS. 1 and 2 are partial perspective views of a stormwater treatment device with part of the tank cut away.
Figure 2:
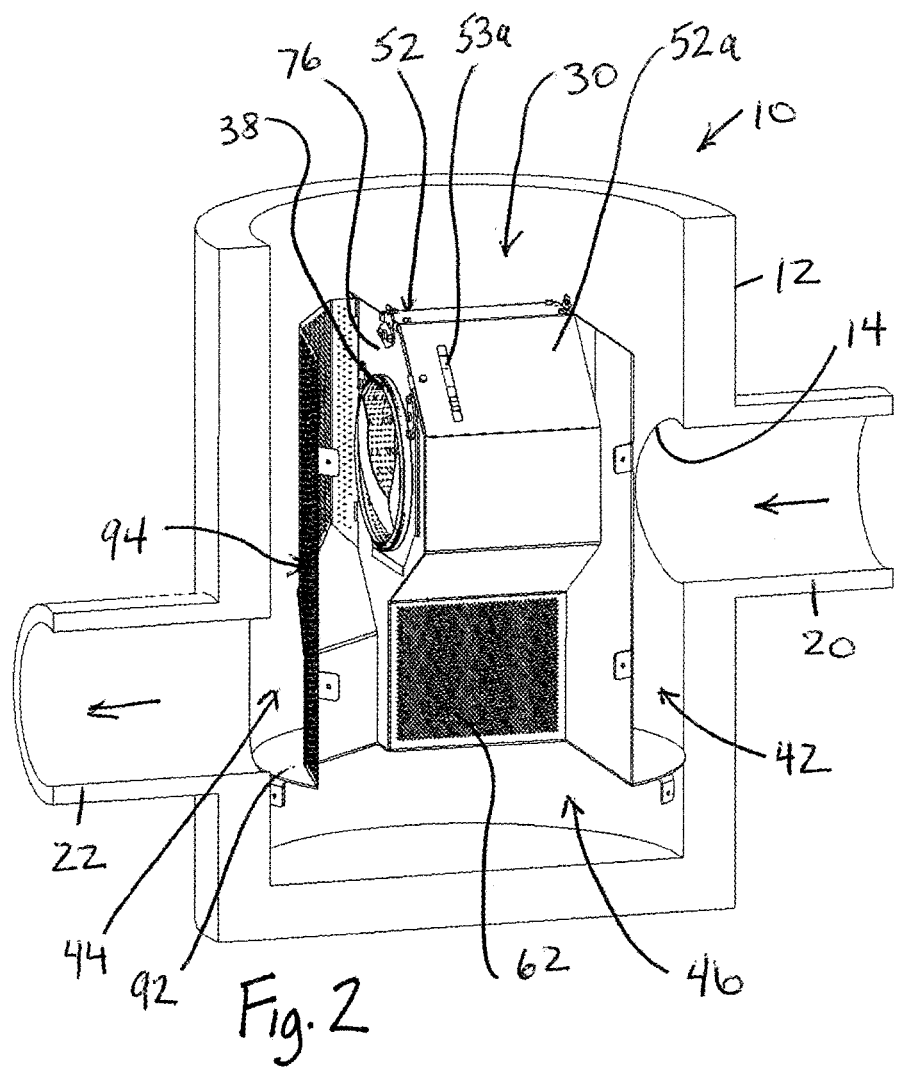
Figure 3:
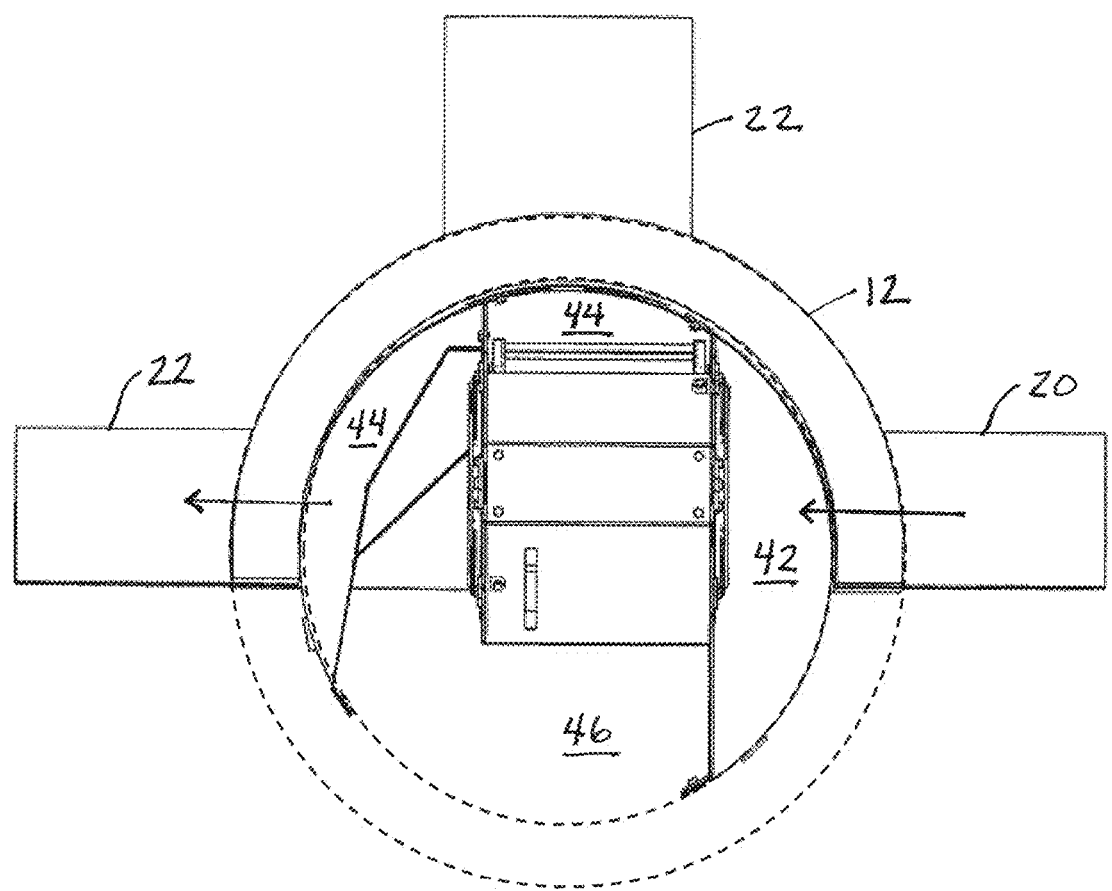
FIG. 3 is a top plan view of the stormwater treatment device.
Figure 4:
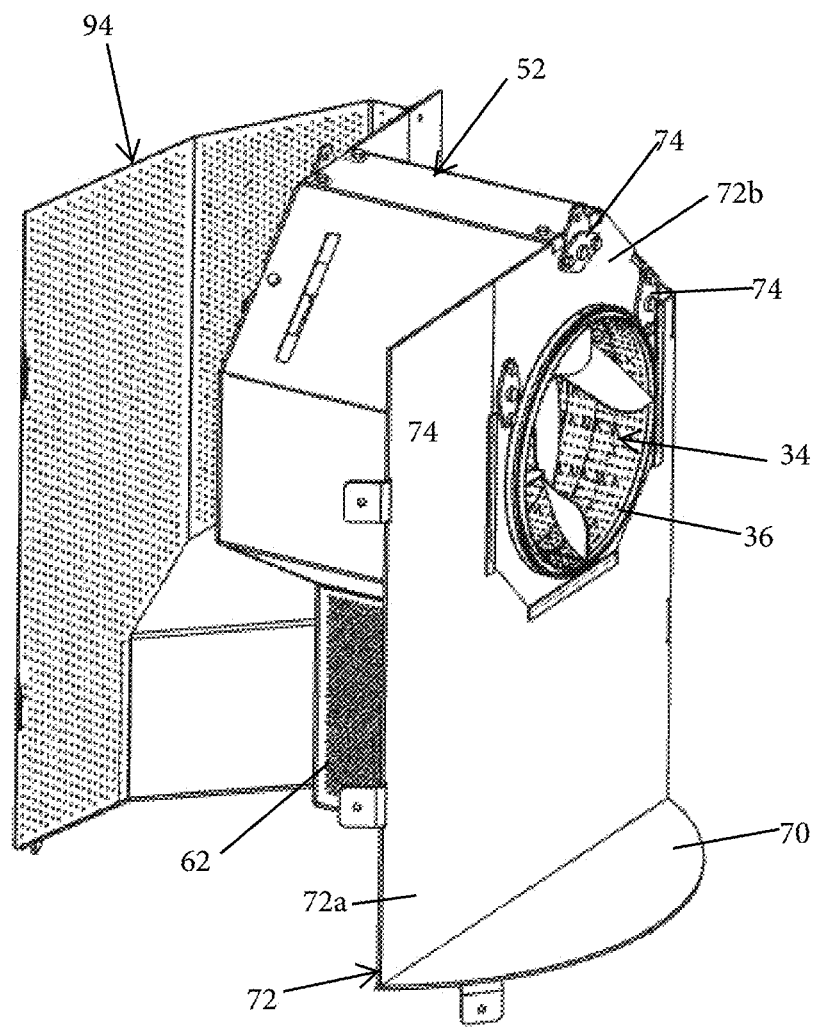
FIGS. 4 and 5 are perspective views of the insert of the stormwater treatment device.
Figure 5:
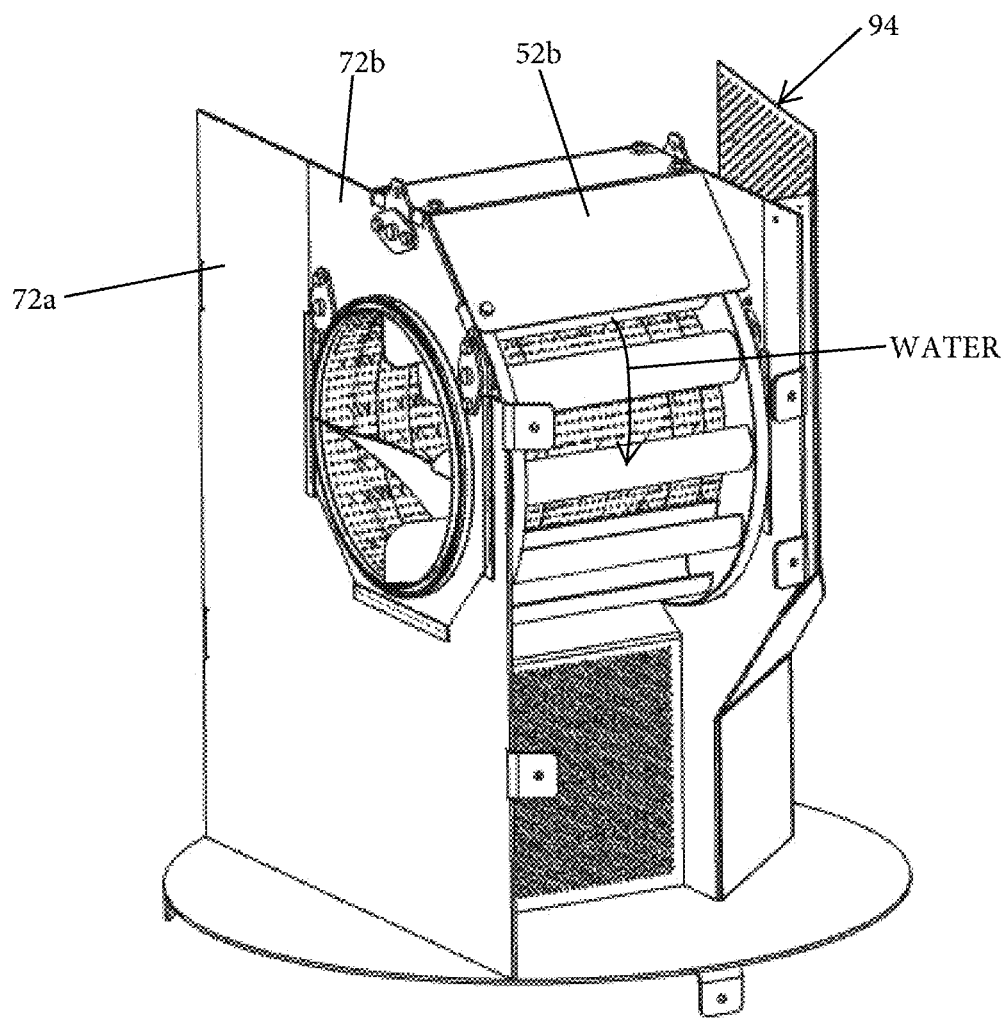
Figure 6:
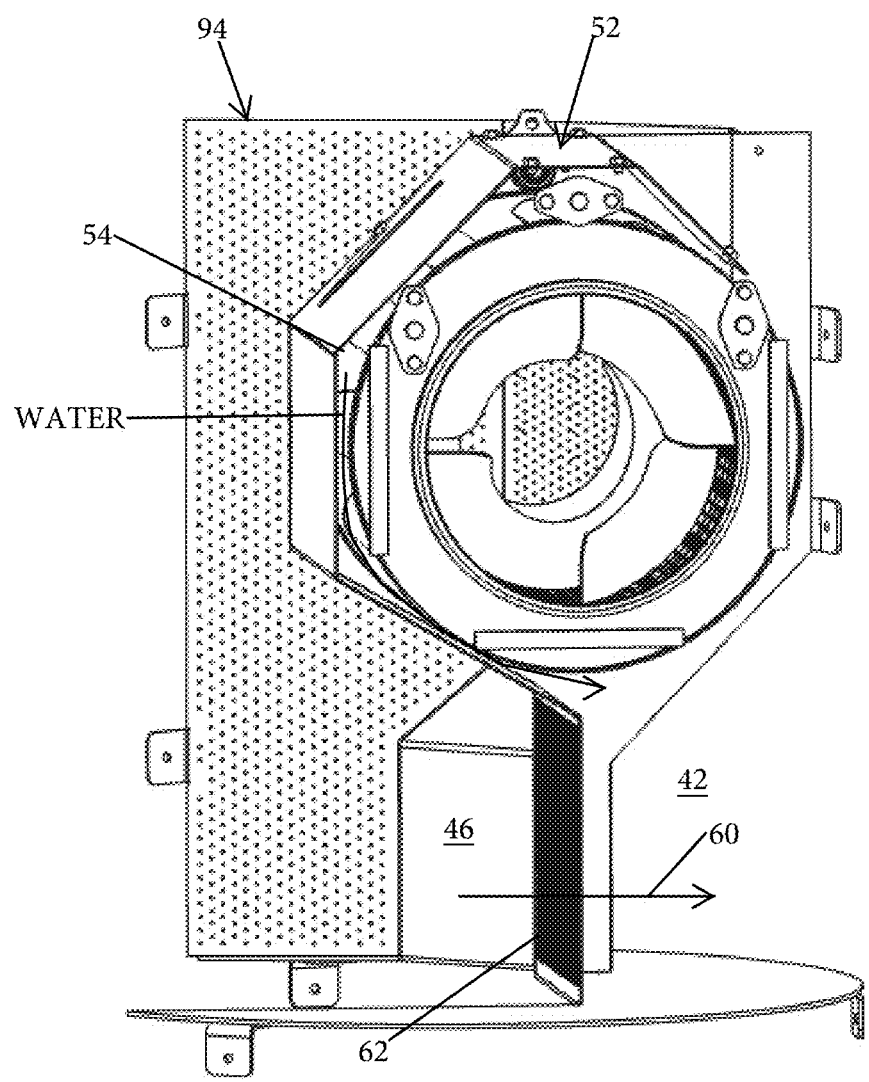
FIGS. 6-9 are partial perspective views (some components not shown) of the insert.
Figure 7:
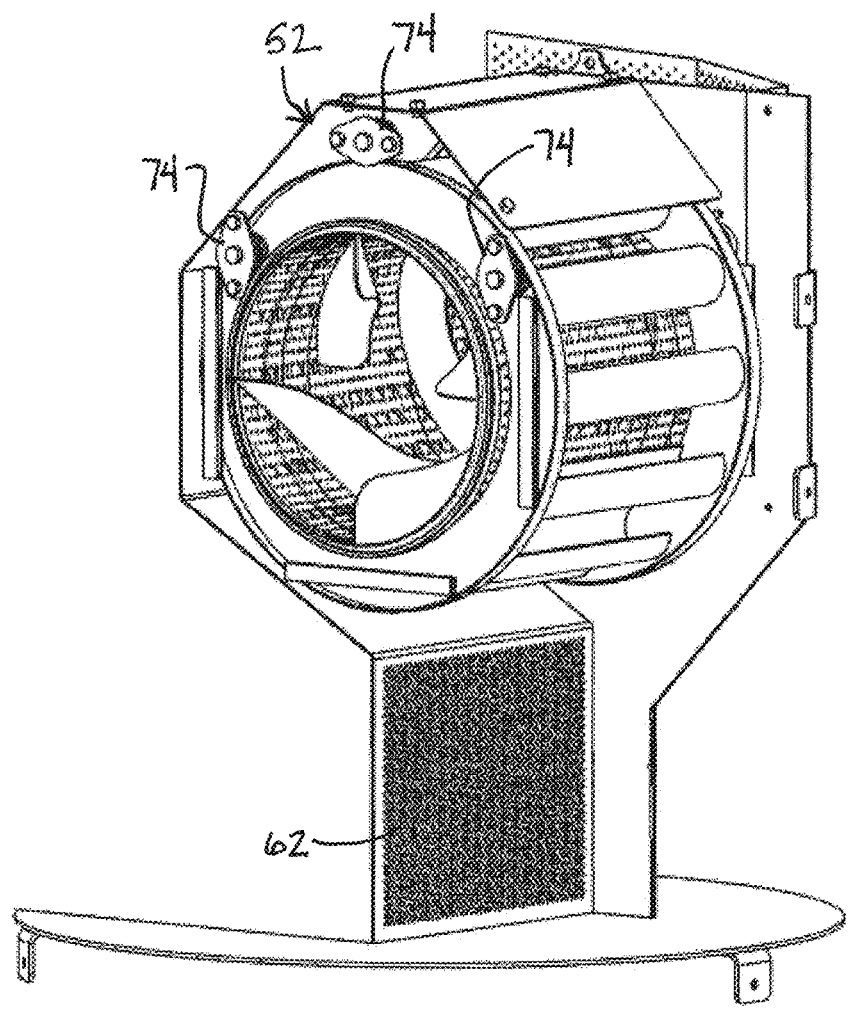
Figure 8:
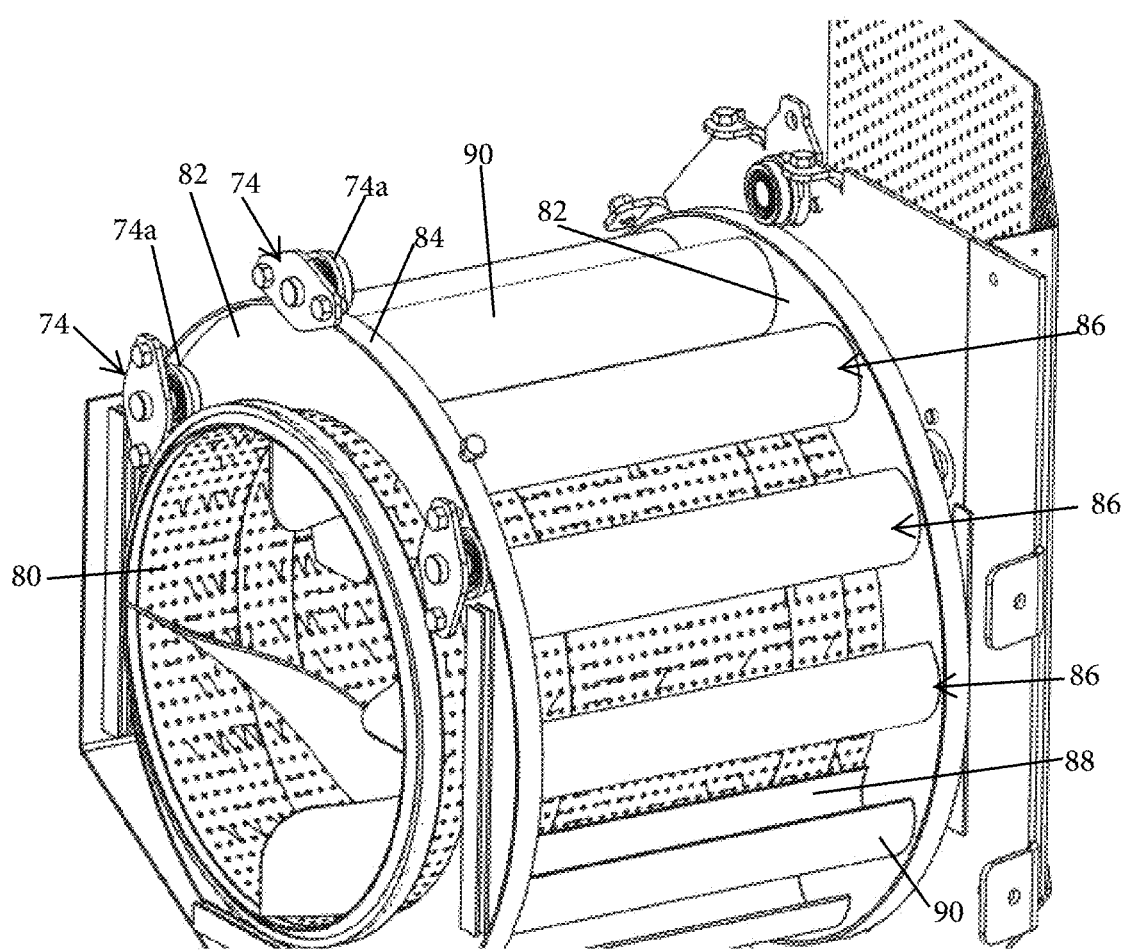
Figure 9:
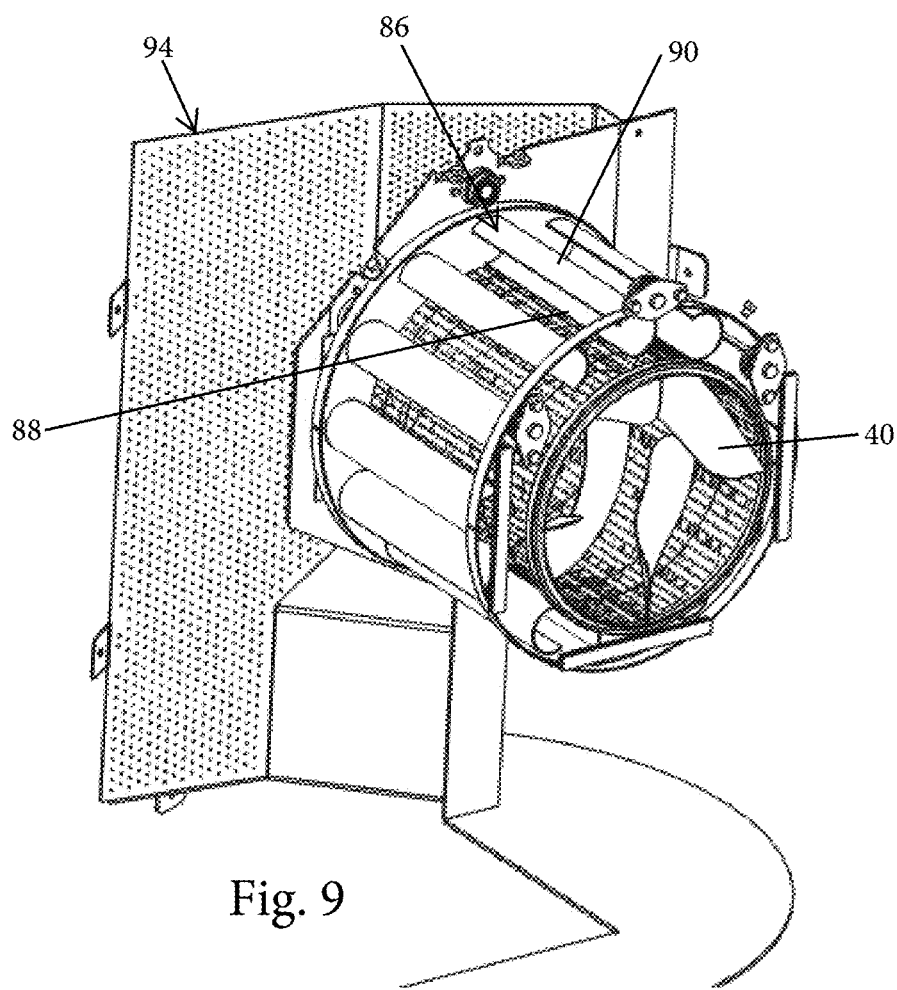

Referring to FIGS. 1-9, one embodiment of a stormwater treatment device 10 includes a cylindrical or rectangular or other shape tank 12 (e.g., a concrete manhole or vault, or a metal or plastic tank structure) with an inlet opening 14 and an outlet opening or openings 16 through the tank sidewall 18. An inlet pipe 20 connects to opening 14 and an outlet pipe/pipes 22 connect to the opening/openings 16. The tank includes an insert structure 30 that is configured to control flow through the tank. The tank insert 30 supports a rotatable screen unit 32 within the tank. The rotatable screen unit 32 is barrel-shaped (e.g., cylindrical (round or other), or cylindrical with tapered ends, or conical, or some other circumscribing tubular shape, all of which are encompassed by the term barrel-shaped) to define a through path 34 with an inlet end 36 and an outlet end 38. The rotatable screen unit has a tubular screen structure 80 with a plurality of screening openings (not shown in all views) for allowing passage of water therethrough while preventing passage of trash items. The rotatable screen unit 32 includes at least one internal blade 40 (e.g., one, two or more, or three or more) within the through path 34 such that water entering the inlet end 36 of the through path interacts with the internal blades 40.

The insert 30 is also configured to define an inlet bay 42, an outlet bay 44 and a trash bay 46. The inlet bay 42 is located around the inlet 14 of the tank and includes an outlet opening 50 positioned such that the inlet end 36 of the through path is open to the inlet bay 42 for water entry. The outlet bay 44 is located for delivering water to the outlet 16 of the tank. The trash bay 46 is located at least partly between inlet bay 42 and the outlet bay 44.

The insert also defines the support housing 52 for the rotatable screen unit 32. The support housing defines a path or paths 54 at an external surface side of the screen unit 32 for delivering water that passes through the screening openings to the outlet bay 44 without such water passing through the outlet end 38 of the rotatable screen unit 32 into the trash bay 46. Trash items that pass along the through path 34 and out of the outlet end 38 of the rotatable screen unit are captured within the trash bay 46. Plate segments 52a and 52b may include inspection slots, such as 53a, for viewing the internals to determine if cleaning or maintenance is needed.

The insert 30 also defines a flow path 60 from the trash bay 46 to the outlet bay 44, with a stationary screen unit 62 (aka trash bay screen) located along the flow path to maintain captured trash items with the trash bay. The helical configuration of the internal blades 40, in combination with the rotation of the screen unit 30, pushes trash items along the through path 34 and out of the outlet end 38 of the through path 34.

The inlet bay 42 is defined by a lower deck panel 70 and an upright wall 72 with wall segments 72a and 72b. Wall segment 72b includes the opening to receive an end portion of the rotatable screen unit and carries bearing assemblies 74 to rotatably support the screen unit 30. Wall segment 72a may include a lower area 73 that is perforated or screened to permit drain down under no flow conditions. An end wall segment 76 toward the outlet end of the screen unit also includes an opening and carries bearing assemblies 74 to rotatably support the screen unit 30. In this regard, the screen unit 30 includes the tubular screen structure 80 with the screening openings (not shown) and a frame structure with annular end panels 82, where each annular end panel 82 includes a peripheral rim 84 that is engaged by the bearing assemblies 74 (e.g., at each end, the rotating wheel 74a of one or more assemblies 74 engages with the internal surface of the rim 84 and the rotating wheel 74a of one or more assemblies 74 engages with the external surface of the rim 84). In this manner, the screen unit 30 is supported for free rotation by the bearing assemblies 74, and the bearing assemblies prevent axial movement of the screen unit 30. The upper most bearing assembly wheels 74a at each end prevent the screen unit from shifting vertically upward.

Notably, the frame structure of the screen unit 30 also includes a series of external drive paddles, which here take the form of trough structures 86, at the external side of the tubular screen structure 80 to form a paddle wheel type structure. Each trough structure has a water flow capture face 88 (here the concave face) and a water flow pass face 90 (here the convex face). The trough structures are oriented so that water flow passing through the tubular screen structure 80 at the outlet bay side will be captured by the water flow capture faces 88 and water flow passing through the screen structure toward the trash bay side will engage with and run off of the water flow pass faces 90. The combined effect is that the water flow passing through the tubular screen structure 80 interacts with the trough structures 86 in a manner to drive the rotation of the screen unit 30.

The upright wall 72 is configured such that if flow into the tank exceeds a rated flow rate for treatment, causing the water level in the inlet bay 42 to rise, the water will overflow at the lower section of the wall segment 72b directly into the outflow bay 44.

The outlet bay is defined by a lower deck panel 92 and an upright wall or walls 94, which here are at least partly perforated. The deck panel 92 may be integral with the deck panel 70 (e.g., formed of the same plate).

In a typical installation, the tank includes a top wall (not shown) that may include an access opening (e.g., a manhole) to enable access to the internal space of the tank when the stormwater treatment device is installed in the field.

In operation, device 10 receives flow through the inlet pipe 20 which enters the inlet bay 42. The system is designed to treat a specific capacity of water called the treatment flow rate. The inlet bay 42 allows sediment, and any heavy trash and debris to settle. From the inlet bay 42, stormwater travels into rotatable screen unit 30, which separates trash items from the water. If the system experiences flow higher than the treatment flow rate, water will spill over the lower portion of the wall segment 72b, and over the rotatatable screen housing 52 and into the outlet bay 44 and exit via the outlet pipe 22.

As described above, the rotatable screen unit 30 is supported by the bearing assemblies 74, which allow the unit to rotate. The kinetic energy of the water entering the inlet end 36 is converted into rotational energy of the screen unit by the internal blades 40. Water exits through the screening openings in the tubular screen structure 80, into the outlet bay 44 and then out via the outlet pipe 22. Multiple outlet pipes and/or angles of outlet pipe position may be used. Trash is separated from the stormwater as it passes through the rotating tubular screen structure 80 and is transported into the trash bay 46 via the internal blades 40. The combination of the trash migration across the screen and the turbulent water flow caused by deflection off the rotating blades 40 generates a scrubbing action, keeping the internal surface of the tubular screen structure clean. High water velocity across the screen at high flow conditions also keeps the screen clean to inhibit blinding of the screen.

The paddle wheel frame structure of the screen unit 30 assures that, at high flows, water exits through the tubular screen structure screening openings and deflects off the outer troughs causing the assembly to rotate with added power from the water deflection impact. At low flows, water exits through the screening openings of the tubular screen structure and fills the troughs, causing the system to rotate due to the weight of the water. If flow is too low to rotate the cylinder, the bottom of the tubular screen structure will blind with trash which causes the water elevation to rise and discharge into higher outer troughs. This causes rotation and cleans the blinded tubular screen structure, in return dropping the water surface elevation. This process is repeated and enables the rotating tubular screen structure cleaning action at all flow conditions.

Trash exits out of the rotatable screen unit 30 and into the trash bay 46, which, optionally, has a large sump for storage. The trash bay screen 62 is positioned on the vertical wall under the rotatable screen unit. The turbulent water exiting the rotating tubular screen structure falls to the deck 92 and back flushes the trash bay screen 62. This constant action enables the screen 62 to stay clean and not blind. Multiple trash bay screens could be provided. The screen(s) 62 help regulate the water surface elevation inside the trash bay 46 and enables the system to drain down, particularly during lower flow rates through the rotatable screen unit that do not impinge upon the perforated wall(s) 94. At larger flows, water passes over the blades 40 of the screen unit, all the way through the through passage of the rotatable screen unit 30 and onto the perforated outlet bay wall(s) 94. The water jetting effect on the perforated outlet wall(s) 94 keeps trash from blinding it and ensures the trash bay water surface elevation stays below the rotatable screen unit 30.

Thus, the described stormwater treatment device provides numerous benefits, including the following.

The kinetic energy of the water entering the rotatable screen unit 30 is translated into rotational energy, primarily by movement of the water to interact with the outer troughs. Due to the screen rotation and turbulent water flow, high- and low-pressure zones are created which allow the trash to be flushed from the low-pressure zones. This results in trash filled water always encountering clean screen enhancing the flow capacity and longevity of the system.

In the illustrated device 10, the internal surface side of the tubular screen structure of the rotatable screen unit has two short and two long internal blades, both of which run helically. However, other blade configurations are possible. The blades have four main functions. First, the geometry of the internal blades diverts water higher up on the sides of the rotatable screen unit so that as the water passes through the screen and impacts troughs, rotation of the rotatable screen unit is imparted and maintained. Second, the internal blades have an optimal height to ensure large trash can easily pass through the rotatable screen unit to the trash bay while containing as much water as possible from passing through the outlet end of the rotatable screen unit. Third, the blades create high turbulence, varied flow directions, and differential pressure zones to promote screen cleaning. Fourth, the four blades act as an auger which moves axially trash though the screen unit, from one end to the other, as the screen unit rotates.

The tubular screen structure is encircled by troughs, which act as a paddle wheel for the unit. This is particularly important for lower flow rates to ensure the screen unit continues to rotate and facilitates self-cleaning. It also doubles as a structural frame member of the screen unit.

The suspended bearing design protects the system and keeps it out of the direct path of flow. The wheels are optimally spaced across the rotatable screen unit to combat twisting and thrust forces. The bearing assembly is of a quick release design for ease of maintenance.

The rotatable screen unit separates trash from stormwater and transports the trash it to the trash bay. Trash migrates through the rotatable screen unit causing a scrubbing action which in return cleans the screen. Trash is stored in a designated area, the trash bay, for easier maintenance and it keeps the trash away from the screen so stored trash cannot re-enter the rotatable screen unit and impede progress of incoming trash.

Figure 10:
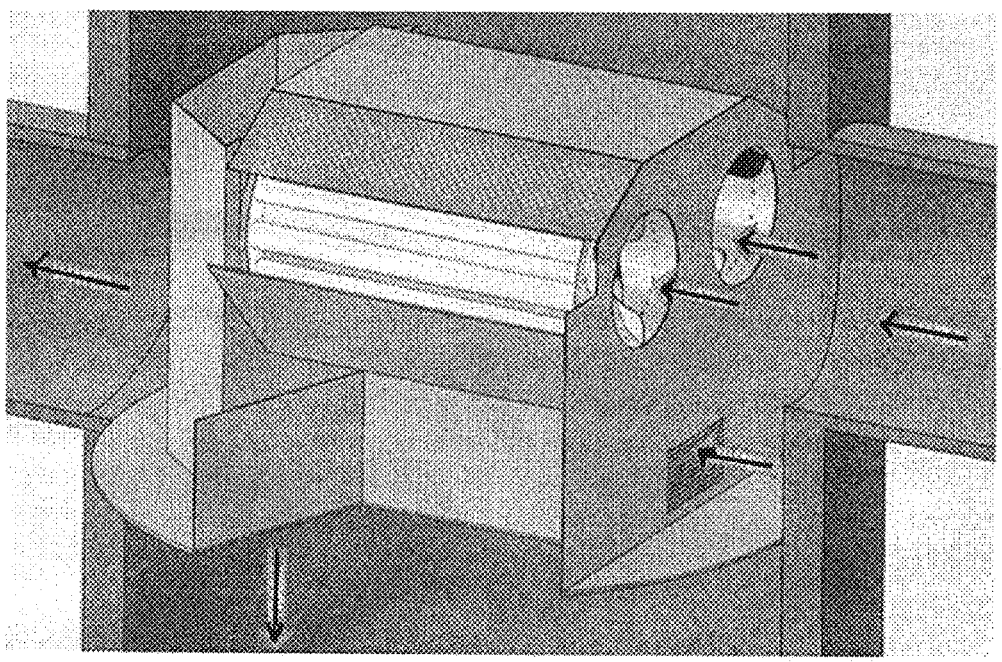
FIG. 10 is a partial perspective view of another embodiment of a stormwater treatment device.
Figure 11:
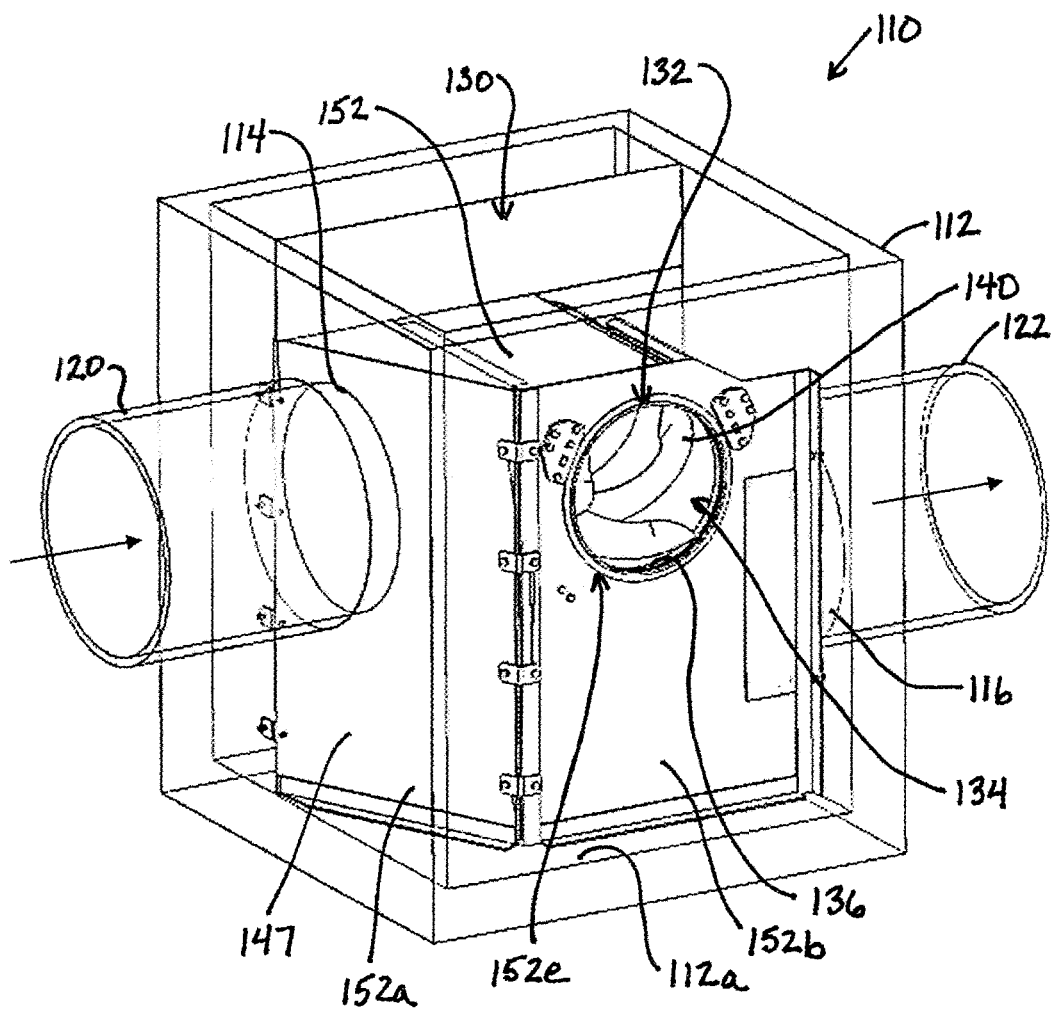
FIGS. 11 and 12 are perspective views of another embodiment of a stormwater treatment device, with walls of tank shown as transparent.
Figure 12:
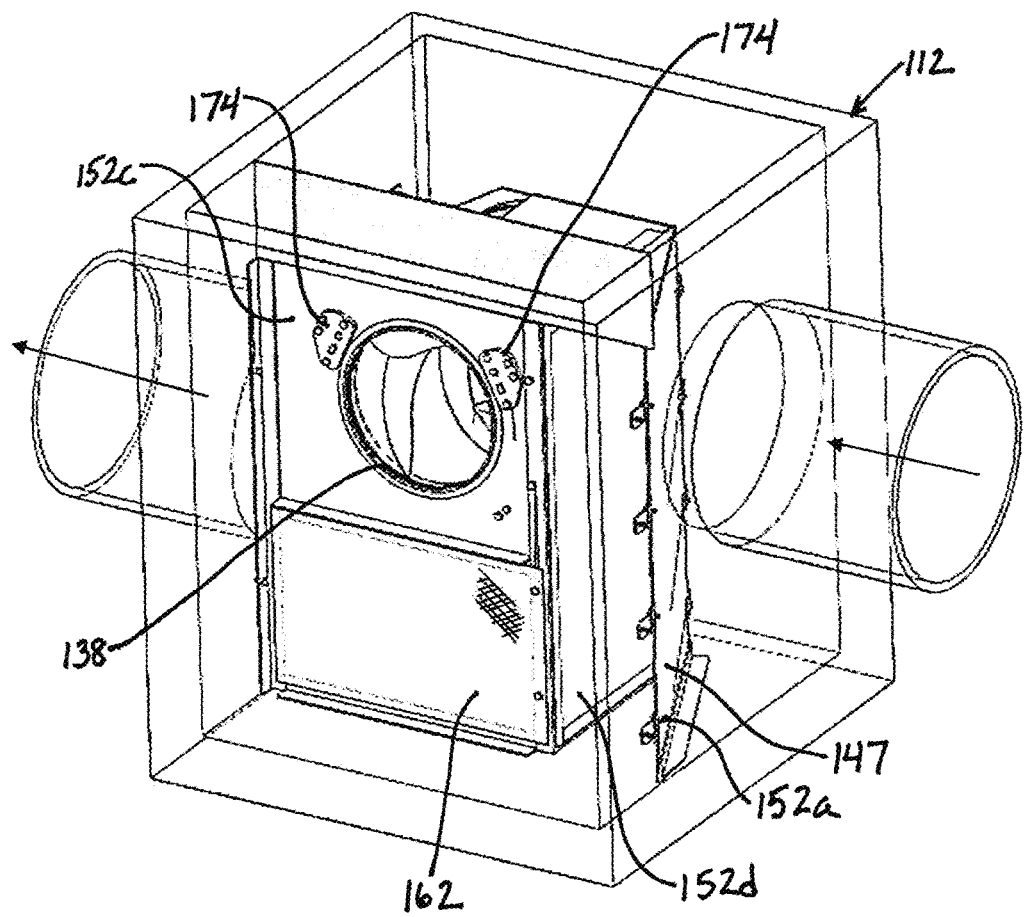
Figure 13:
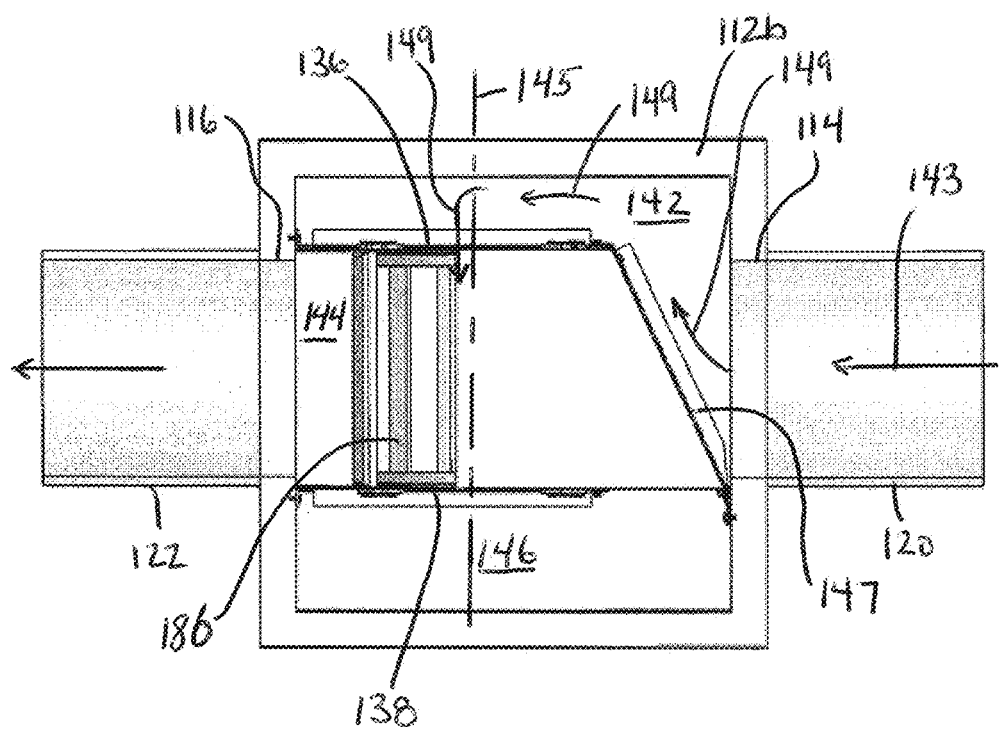
FIG. 13 is a top plan view of the treatment device of FIGS. 11 and 12.
Figure 14:
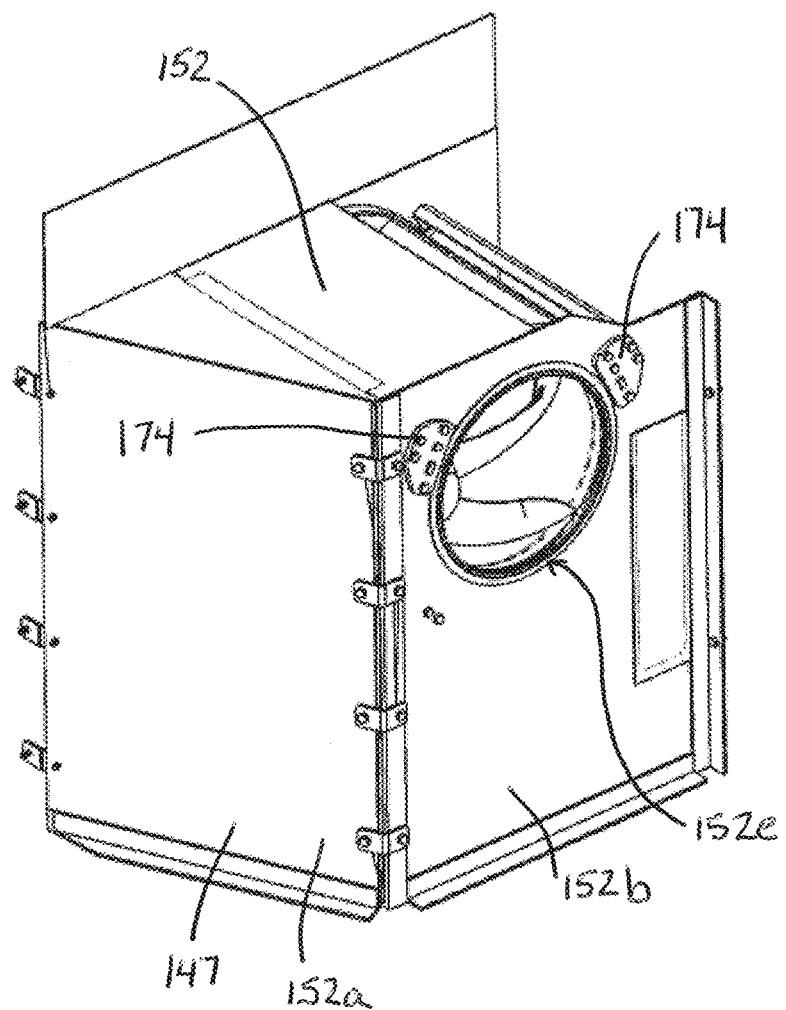
FIGS. 14 and 15 show perspective views of the insert of the treatment device of FIGS. 11 and 12.
Figure 15:
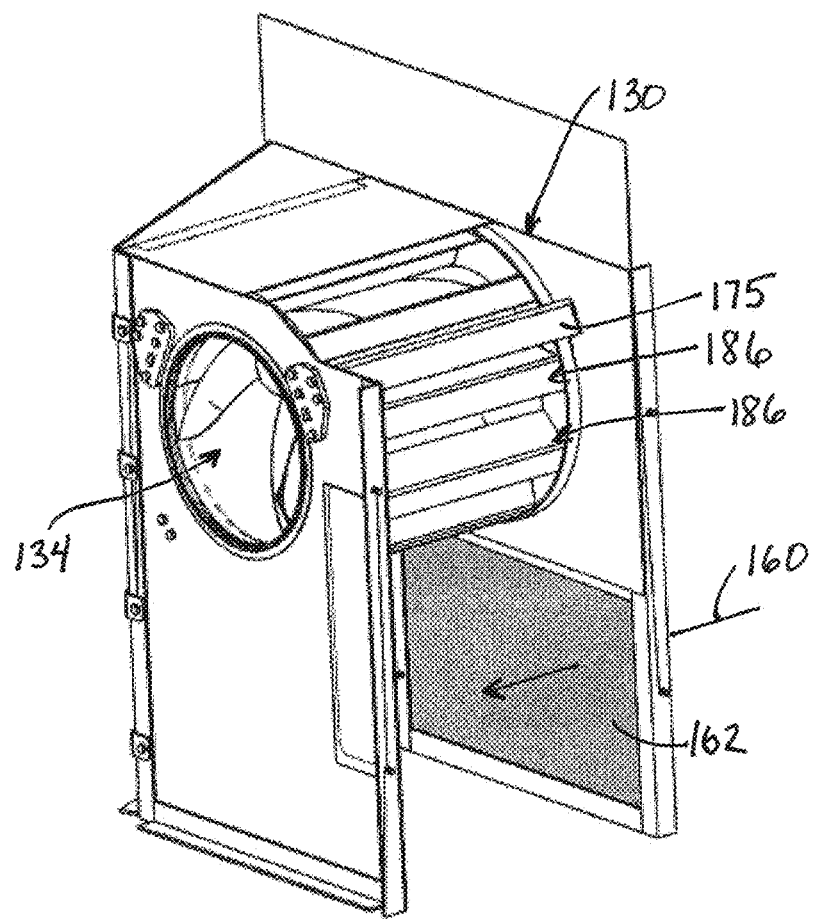

While the above-described embodiment shows a single rotatable screen unit, embodiments with multiple rotatable screen units are also contemplated, as suggested by the embodiment of FIG. 10. Here, the upright wall defining the inlet bay includes a lower screened section for drain down. In addition, one or more rotatable screen units may be installed in various tanks (e.g., various sizes of manhole or vault configurations). Moreover, a baffle could be located between the tank inlet 14 and the inlet end 36 of the rotational screen to protect against large debris launching into the inlet end 36.

Referring now to FIGS. 11-20, another embodiment of a stormwater treatment device 110 includes a rectangular or other shape tank 112 (e.g., in this case, a concrete vault) with an inlet opening 114 and an outlet opening or openings 116 through the tank sidewall 118. An inlet pipe 120 connects to opening 114 and an outlet pipe/pipes 122 connect to the opening/openings 116. The tank includes an insert structure 130 that is configured to control flow through the tank. The tank insert 130 supports a rotatable screen unit 132 within the tank. The rotatable screen unit 132 is barrel-shaped (e.g., cylindrical (round or other), or cylindrical with tapered ends, or conical, or some other circumscribing tubular shape) to define a through path 134 with an inlet end 136 and an outlet end 138. The rotatable screen unit has a tubular screen structure 180 with a plurality of screening openings (not shown) for allowing passage of water therethrough while preventing passage of trash items. The rotatable screen unit 132 includes at least one internal blade 140 (e.g., one, two or more, or three or more, each running helically) within the through path 134 such that water and trash entering the inlet end 136 of the through path interacts with the internal blades 140.

The insert 30 is also configured to define an inlet bay 142, an outlet bay 144 and a trash bay 146. Here, the inlet bay 142 is located around the inlet 114 of the tank and to one side of the inlet, and feeds incoming water to the inlet end 136 of the through path 134. Notably, in the device 110, the infeed direction 143 of incoming water is not aligned, or substantially aligned, with the rotation axis 145 of the screen unit 132. Instead, incoming water is deflected by the housing of the insert (e.g., angled housing wall segment 147), which dissipates energy and protects the rotatable screen unit 132 from large or heavy objects, and diverts objects toward the tank wall and away from the screen unit 132. The water then turns to flow into the through path 134, per exemplary flow arrows 149. Thus, the incoming direction 143 of the water flow to the tank 112 is, here, transverse, in particular, perpendicular or substantially perpendicular, to the rotation axis 145. The outlet bay 144 is located for delivering water to the outlet 116 of the tank. The trash bay 146 is located at the outlet end 138 of the rotatable screen unit.

The insert also defines the support housing 152 for the rotatable screen unit 132. Within the support housing, a path or paths 154 are provided at an external surface side of the screen unit 132 for delivering water that passes through the screening openings to the outlet bay 144 without such water passing through the outlet end 138 of the rotatable screen unit 132 into the trash bay 146. Trash items that pass along the through path 134 and out of the outlet end 138 of the rotatable screen unit are captured within the trash bay 146.

The insert 130 also defines a flow path 160 from the trash bay 146 to the outlet bay 144, with a stationary screen unit 162 (aka trash bay screen) located along the flow path to maintain captured trash items with the trash bay. The helical configuration of the internal blades 140, in combination with the rotation of the screen unit 130, pushes trash items along the through path 134 and out of the outlet end 138 of the through path 134 into the trash bay 146.

Here, the inlet bay 142 is defined by the tank bottom wall 112a, upright tank side walls 112b (or portions thereof) and wall segments 152a (also 147) and 152b of the insert support housing 152. Wall segment 152b includes an opening 152e (i.e., the outlet opening of the inlet bay 142) to receive an end portion of the rotatable screen unit and carries bearing assemblies 174 to rotatably support the screen unit 30. An end wall segment 152c toward the outlet end of the screen unit also includes an opening and carries bearing assemblies 174 to rotatably support the screen unit 130. In this regard, the screen unit 130 includes the tubular screen structure 180 with the screening openings (not shown) and a frame structure with annular end panels 182, where each annular end panel 182 includes a peripheral rim 184 that is engaged by the bearing assemblies 174 (e.g., at each end, the rotating wheel 174a of a track bearing of each assembly 174 engages with the internal surface of the rim 184, and the rotating wheel 174b of a thrust bearing of the assembly engages the external face of the annular end panel 182). In this manner, the screen unit 130 is supported for free rotation by the bearing assemblies 174, and the thrust bearing of the assembly prevents axial movement of the screen unit 130. Notably, the bearing assemblies 174 at opposite ends of the rotatable screen unit are interconnected by cross bars 175 to accurately separate the wall segments 152b and 15c while keeping those wall segments parallel. Additional cross bars 177, not associated with bearings, may also be provided between the wall segments 15b and 152c for such purpose. Crowned roller bearings may be used to provide self-alignment and minimize wear.

Notably, the frame structure of the screen unit 130 also includes a series of external drive paddles, which here take the form of wide V-shaped trough structures 186, at the external side of the tubular screen structure 180 to form a paddle wheel type structure. Each trough structure has a water flow capture face 188 (here the inside surfaces of the V-shape) and a water flow pass face 190 (here the outside surfaces of the V-shape). The trough structures are oriented so that water flow passing through the tubular screen structure 180 at the side of the path 134 near the tank inlet opening will be partially captured by the water flow capture faces 188, and any water flow passing through the screen structure toward the side of the path near the tank outlet opening will engage with and run off of the water flow pass faces 190. The combined effect is that the screened water that has passed through the tubular screen structure 180 interacts with the trough structures 186 in a manner to drive the rotation of the screen unit 130. Here, the helix angle of the internal blades 140 is particularly steep, and the blade height sufficient, to help drive the water higher on the screen structure 180 to provide more driving force for the system. By way of example, blade helix angles may be in the range of thirty to fifty-five degrees, but variations are possible.

The upright wall segment 152b is configured such that if flow into the tank exceeds a rated flow rate for treatment, causing the water level in the inlet bay 142 to rise, the water will overflow at the lower section of the wall segment 152b directly into the outflow bay 144.

The trash bay 146 is defined by the tank bottom wall 112a, upright tank side walls 112b (or portions thereof) and upright support housing wall segments 152c, 152a and 152d. Notably, here, the upper end of wall panel segment 152c extends to the top of the tank to prevent trash in the trash bay 146 from overflowing into the outlet bay 144. In some embodiments, this upper portion may also be formed by one or more screens that allow water flow from the trash bay to the outlet bay, while keeping trash in the trash bay. The outlet bay 146 is defined by the tank bottom wall 112a, part of the upright tank side wall 112b that includes the outlet opening 114, and upright support housing wall segments 152b, 152c and 152d.

In a typical installation, the tank includes a top wall (not shown) that may include an access opening (e.g., a manhole) to enable access to the internal space of the tank when the stormwater treatment device is installed in the field and/or a clean out hole or holes directly over the trash bay 146 or the other bays.

In operation, device 110 receives flow through the inlet pipe 120 which enters the inlet bay 142. The system is designed to treat a specific capacity of water called the treatment flow rate. The inlet bay 142 allows sediment, and any heavy trash and debris to settle. From the inlet bay 142, stormwater turns and travels into the rotatable screen unit 130, which separates trash items from the water. If the system experiences flow higher than the treatment flow rate, water will spill over the lower portion of the wall segment 152b and into the outlet bay 144 and exit via the outlet pipe 122.

As described above, the rotatable screen unit 130 is supported by the bearing assemblies 74, which allow the unit to rotate. The kinetic energy of the water is converted into rotational energy of the screen unit by the water passing through the screen and interacting with the trough structures. Water exits through the screening openings in the tubular screen structure 180, into the outlet bay 144 and then out via the outlet pipe 122. Multiple outlet pipes and/or angles of outlet pipe position may be used. Trash is separated from the stormwater as it passes through the rotating tubular screen structure 180 and is transported into the trash bay 146 via the internal blades 140. The combination of the trash migration across the screen and the turbulent water flow caused by deflection off the rotating blades 140 generates a scrubbing action, keeping the internal surface of the tubular screen structure clean. High water velocity across the screen at high flow conditions also keeps the screen clean to inhibit blinding of the screen. Here, the triple internal blades with long pitch configuration helps keep this velocity from stalling, transports trash through the system and pushes water higher up the side of the rotatable screen unit, increasing system torque.

In one example, each of the three internal blades is configured such that the blade moves through ¾ of a helical turn along the entire axial length of the screen unit. So, the internal blade lead is ¾ of a helical turn per screen unit length. In such case, the screen unit needs to rotate ¾ of a revolution for a piece of trash to be transported thru the entire length of the screen unit. In other implementations, the number of blades and/or blade configuration could vary. For example, the blade arrangement could be implemented with each blade configured such that the blade moves through between ⅝ and ⅞ of a helical turn along the entire axial length of the screen unit. In another example, the blade arrangement could be implemented with each blade configured such that the blade moves through between ⅘ and ⅝ of a helical turn along the entire axial length of the screen unit. Still other variations are possible.

Figure 16A:
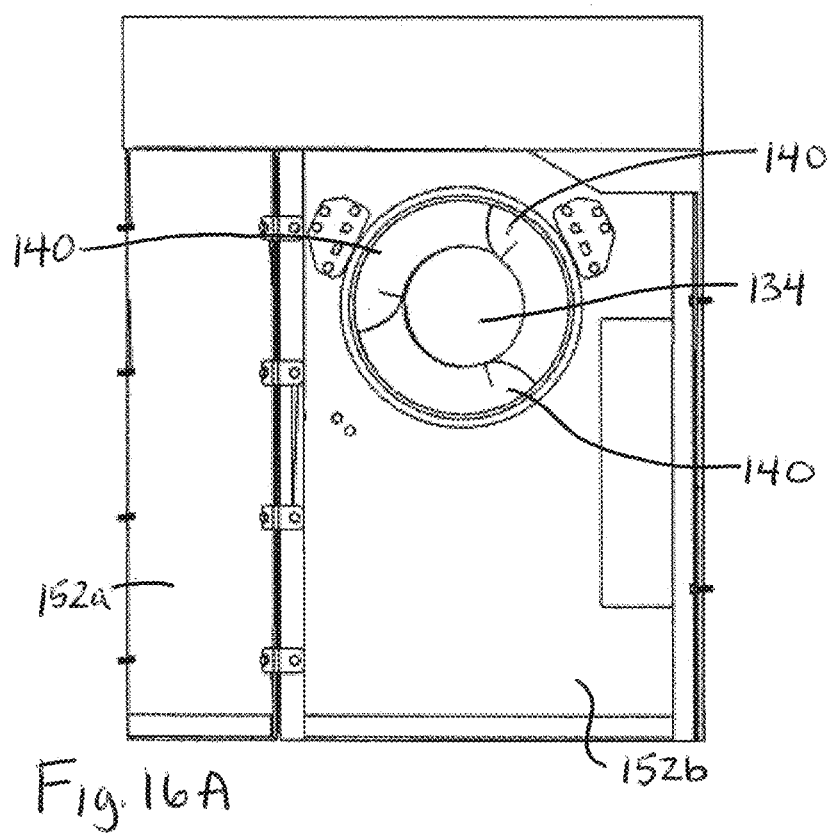
FIG. 16A shows a side elevation of the insert of FIGS. 14 and 15.
Figure 16B:
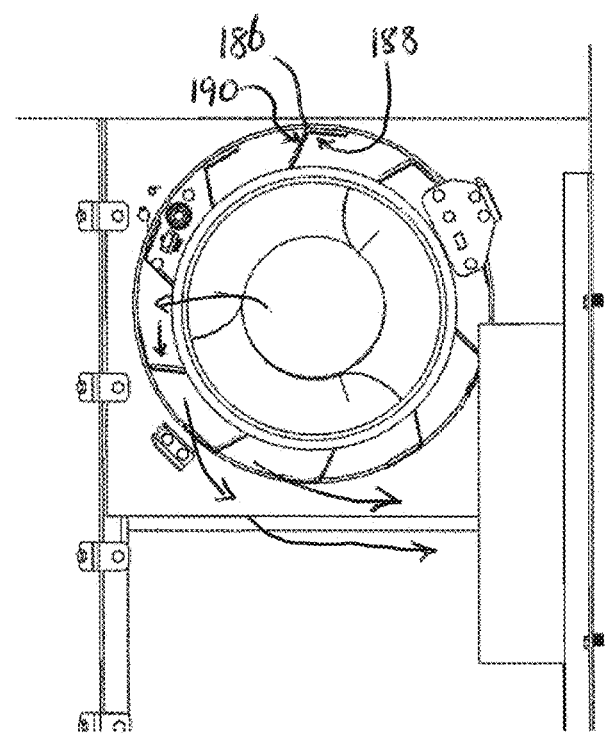
FIG. 16B shows a partial side elevation with some wall segments removed.
Figure 17:
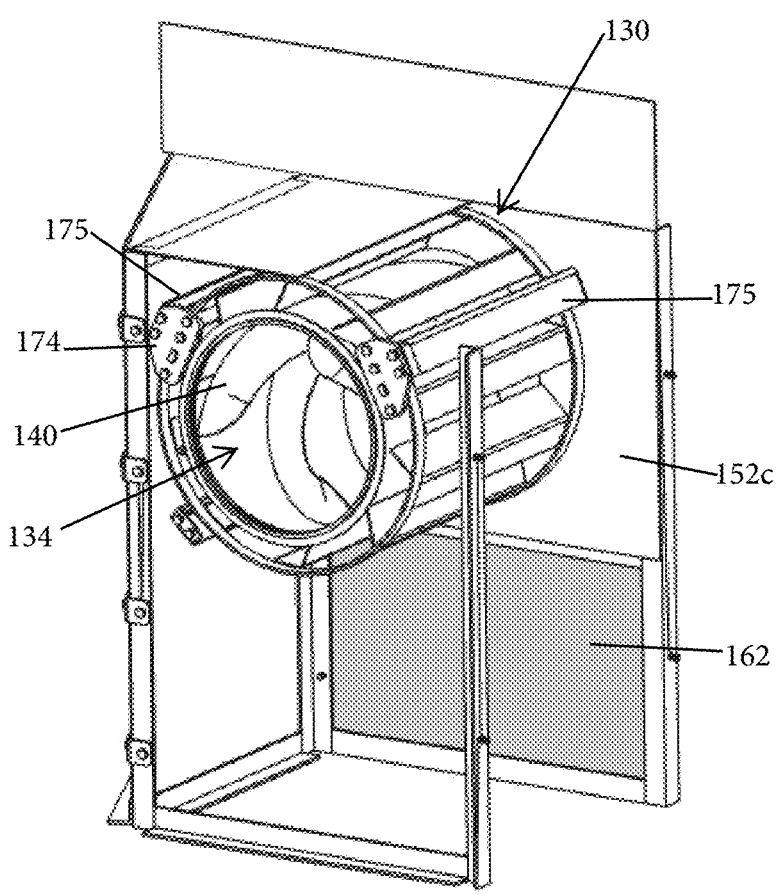
FIGS. 17-19 show partial perspective views of the insert with some components removed to expose the rotatable screen unit structure.
Figure 18A:
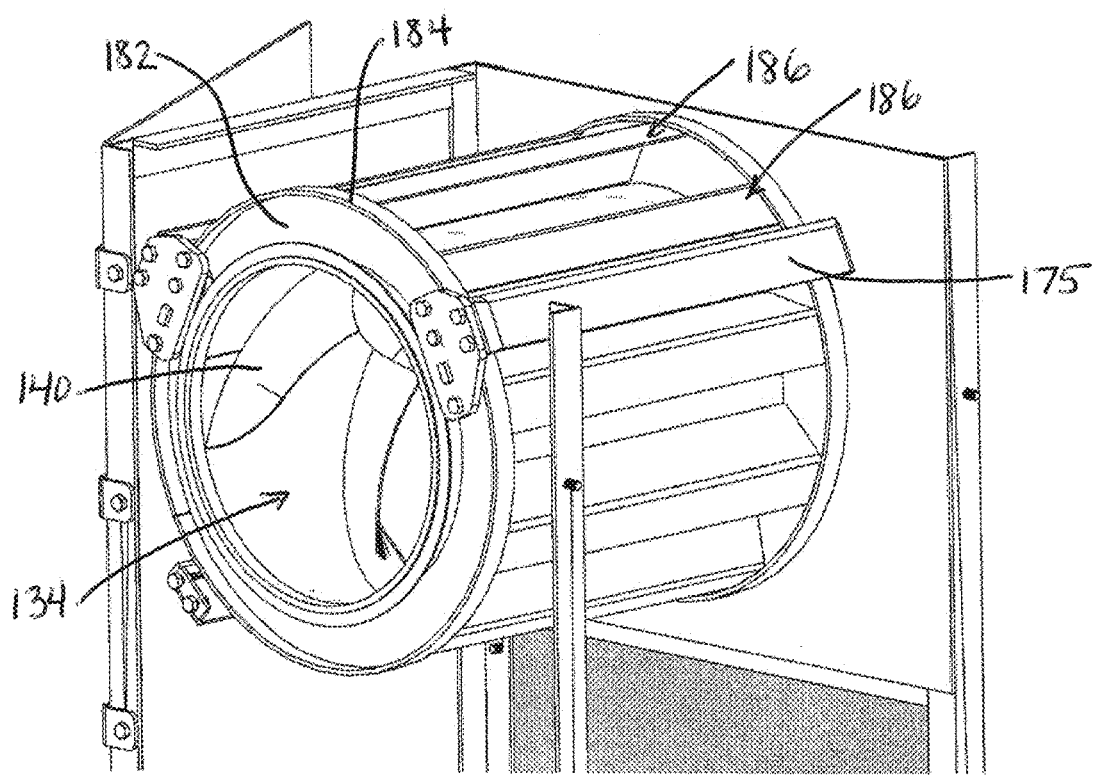
Figure 18B:
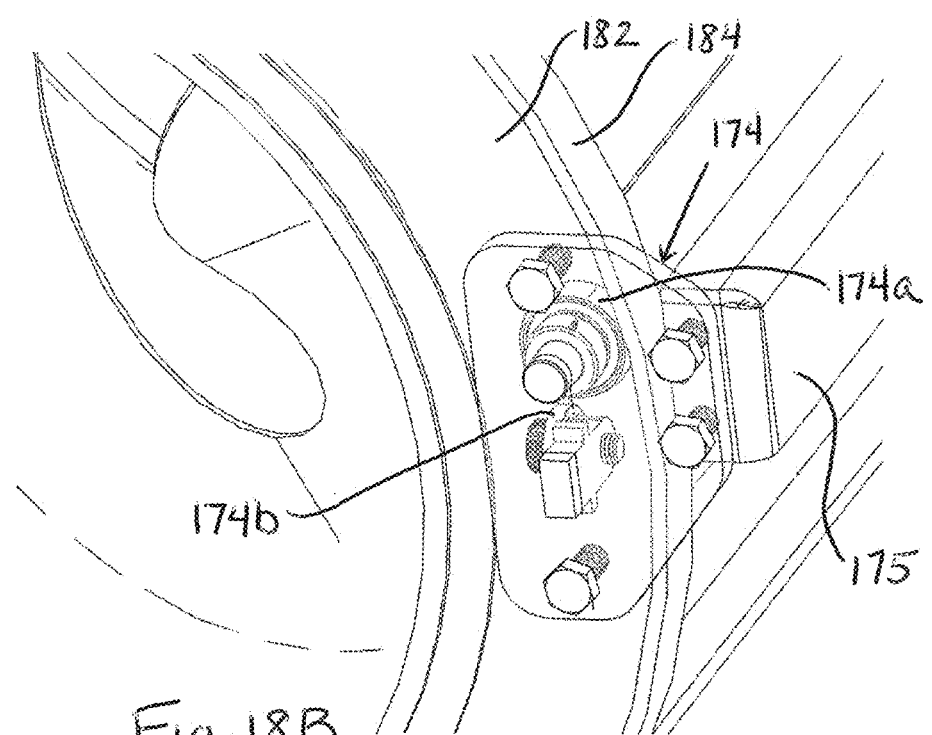
Figure 19:
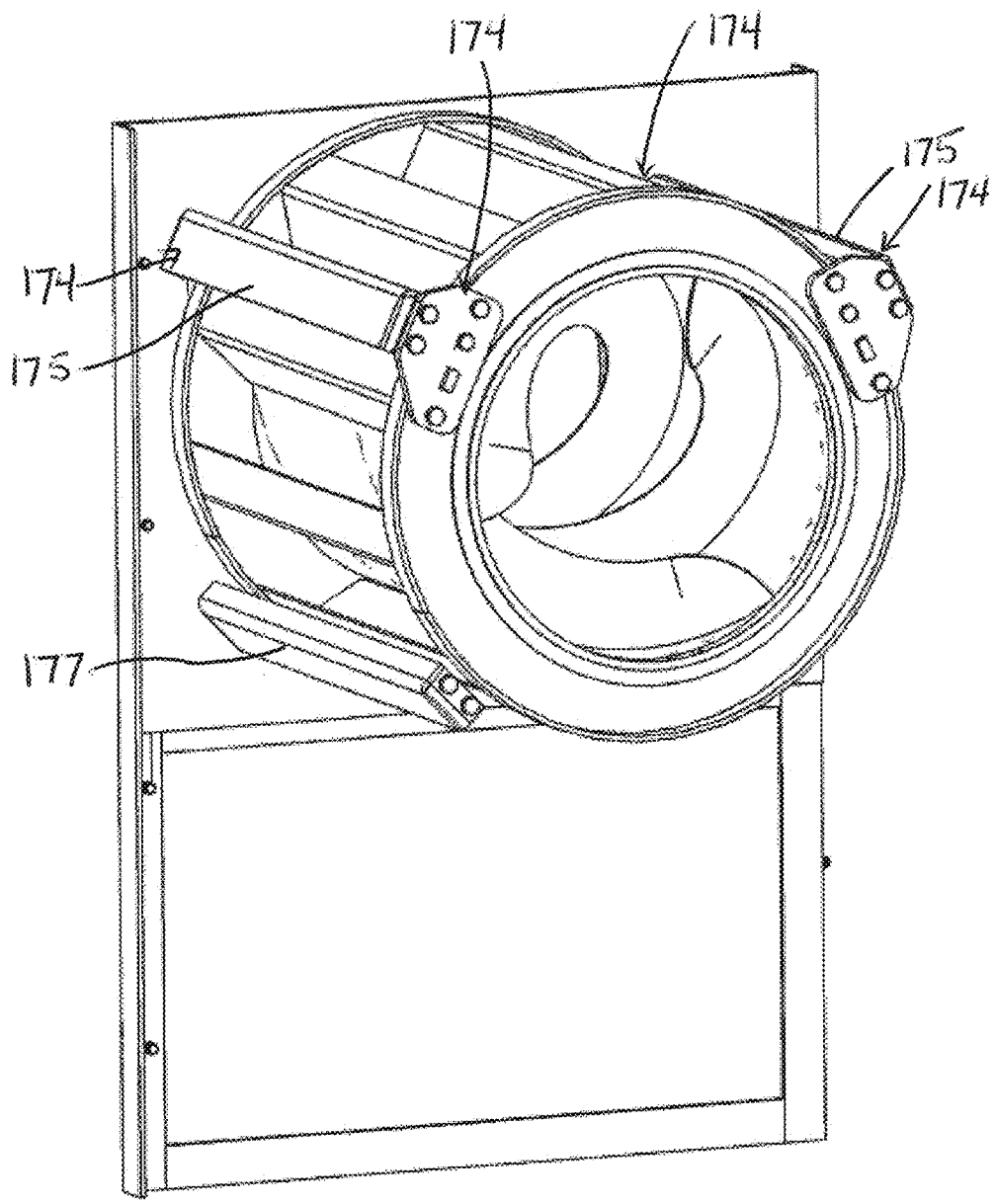

The paddle wheel frame structure of the screen unit 130 assures that, at high flows, water exits through the tubular screen structure screening openings and deflects off the outer troughs causing the assembly to rotate with added power from the water deflection impact. In addition, as seen in FIG. 16B, the water flow direction within the outlet bay toward the tank outlet is oriented to also drive the trough-shaped paddles. Thus, the screened water is the primary driver of rotation of the screen unit 130. At low flows, water exits through the screening openings of the tubular screen structure and fills the troughs, causing the system to rotate due to the weight of the water. If flow is too low to rotate the cylinder, the bottom of the tubular screen structure will blind with trash which causes the water elevation to rise and discharge into higher outer troughs. This causes rotation and cleans the blinded tubular screen structure, in return dropping the water surface elevation. This process is repeated and enables the rotating tubular screen structure cleaning action at all flow conditions.

Trash exits out of the rotatable screen unit 130 and into the trash bay 146, which, in the illustrated embodiment, has no sump. But in some cases a sump could be provided in the trash bay. The trash bay screen 162 is positioned on the upright housing wall segment 152c under the rotatable screen unit. The turbulent water exiting the rotating tubular screen structure falls to the tank bottom wall 152a and back flushes the trash bay screen 162.

This constant action enables the screen 162 to stay clean and not blind. Multiple trash bay screens could be provided. The screen(s) 162 help regulate the water surface elevation inside the trash bay 146 and enables the system to drain down, particularly during lower flow rates through the rotatable screen unit. At larger flows, water passes over the blades 140 of the screen unit, all the way through the through passage of the rotatable screen unit 130.

Thus, the described stormwater treatment device provides numerous benefits, including the following.

The kinetic energy of the water entering the rotatable screen unit 30 is translated into rotational energy, primarily by movement of the water to interact with the outer troughs. Due to the screen rotation and turbulent water flow, high- and low-pressure zones are created which allow the trash to be flushed from the low-pressure zones. This results in trash filled water always encountering clean screen enhancing the flow capacity and longevity of the system.

In the illustrated device 110, the internal surface side of the tubular screen structure 180 of the rotatable screen unit 130 has two three equally spaced long pitch blades, each running helically. However, other blade configurations are possible. The blades have four main functions, as described above.

The tubular screen structure 180 is encircled by the troughs, which act as a paddle wheel for the unit. This is particularly important for lower flow rates to ensure the screen unit continues to rotate and facilitates self-cleaning. It also doubles as a structural frame member of the screen unit.

The suspended bearing design protects the system and keeps it out of the direct path of flow. The wheels are optimally spaced across the rotatable screen unit to combat twisting and thrust forces. The bearing assembly may be of a quick release design for ease of maintenance.

The rotatable screen unit 130 separates trash from stormwater and transports the trash it to the trash bay 146. Trash migrates through the rotatable screen unit causing a scrubbing action which in return cleans the screen. Trash is stored in a designated area, the trash bay, for easier maintenance and it keeps the trash away from the screen so stored trash cannot re-enter the rotatable screen unit and impede progress of incoming trash.

Figure 20:
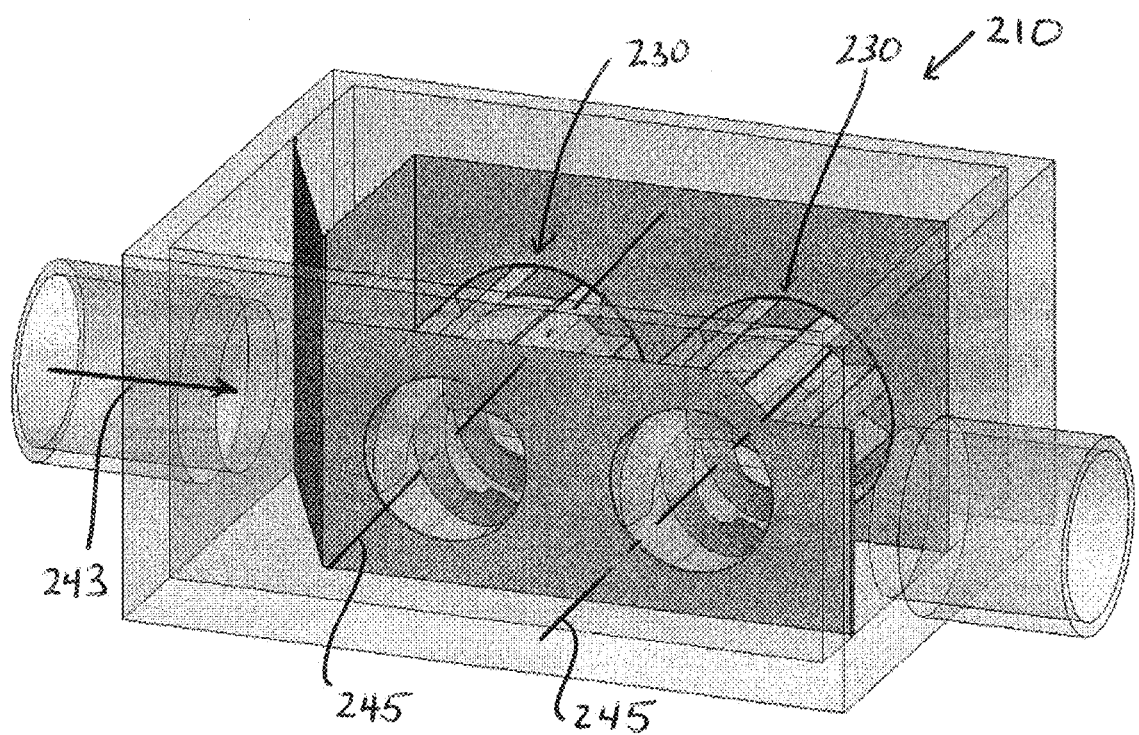
FIG. 20 shows a partial perspective view of another embodiment of a stormwater treatment device including multiple rotatable screen units.
Figure 21:
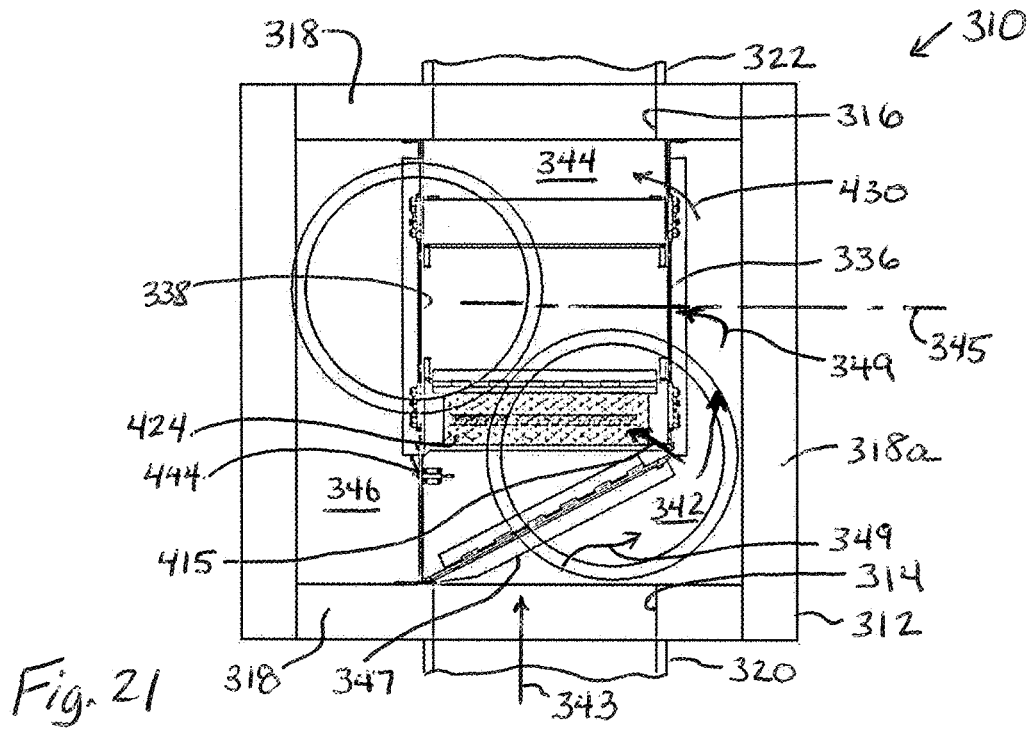
FIGS. 21 and 22 show top plan and perspective views, respectively, of another embodiment of a stormwater treatment device, with walls of the tank depicted as transparent.
Figure 22:
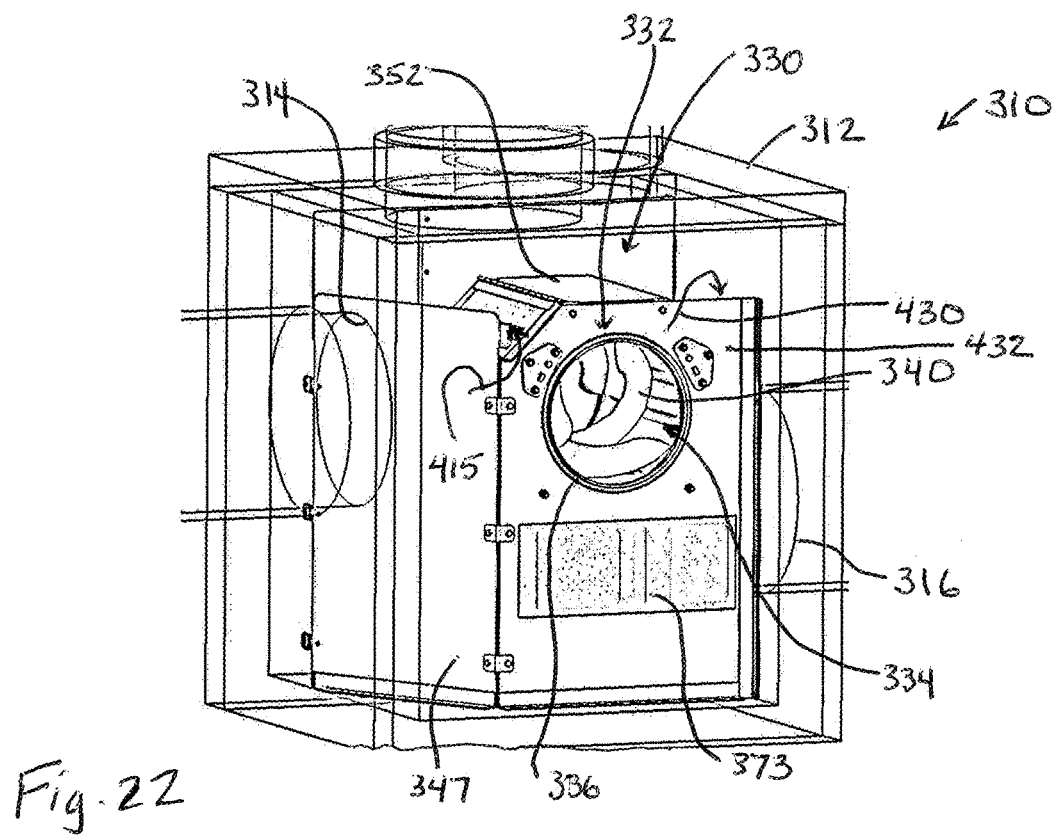
Figure 23:
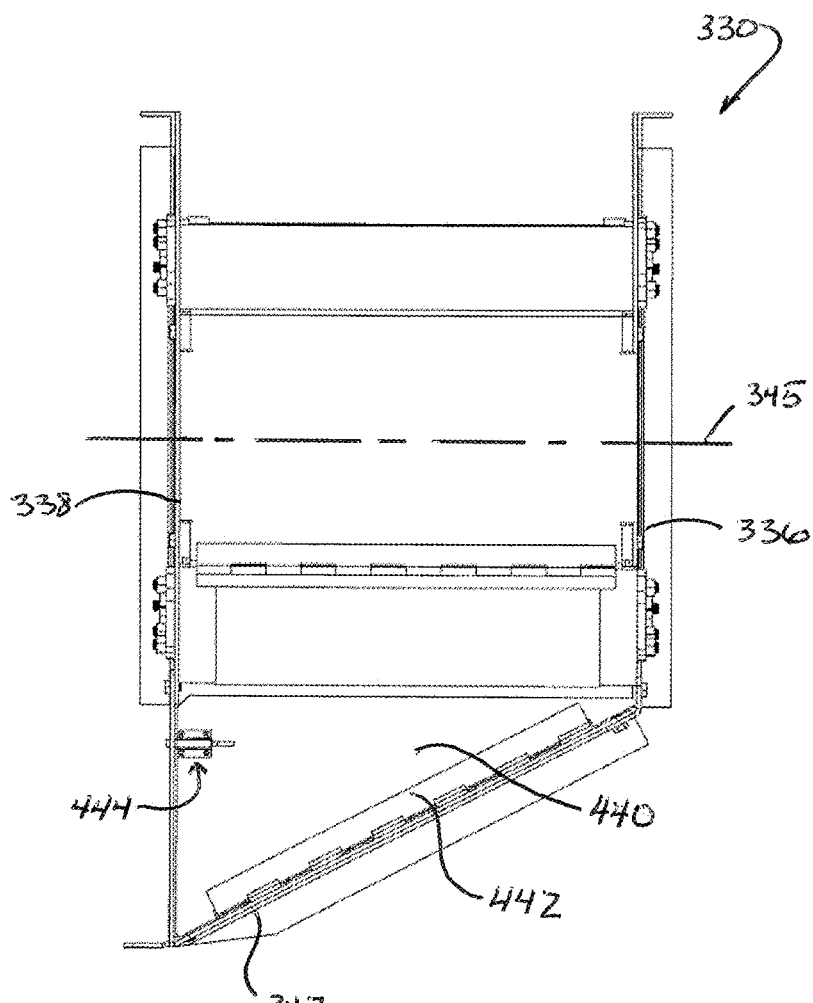
FIGS. 23-27 show views of an insert structure of the stormwater treatment device.
Figure 24:
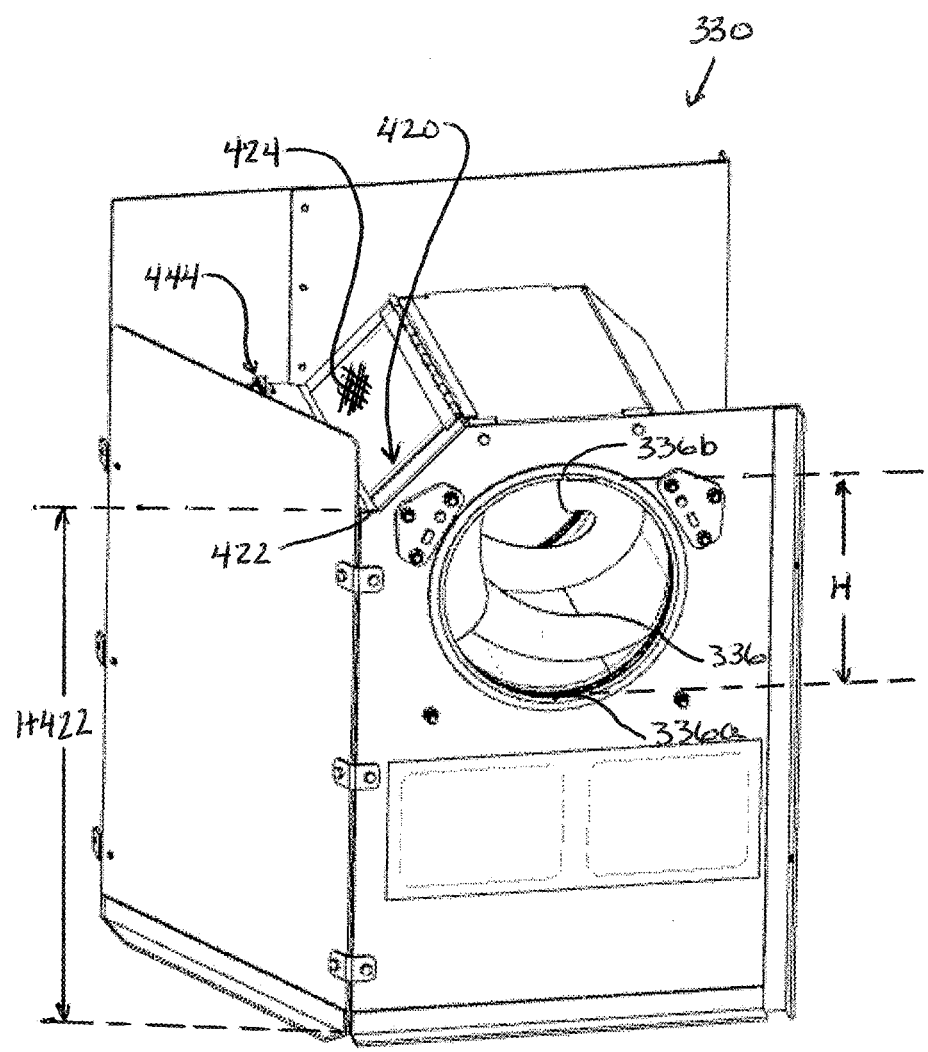
Figure 25:
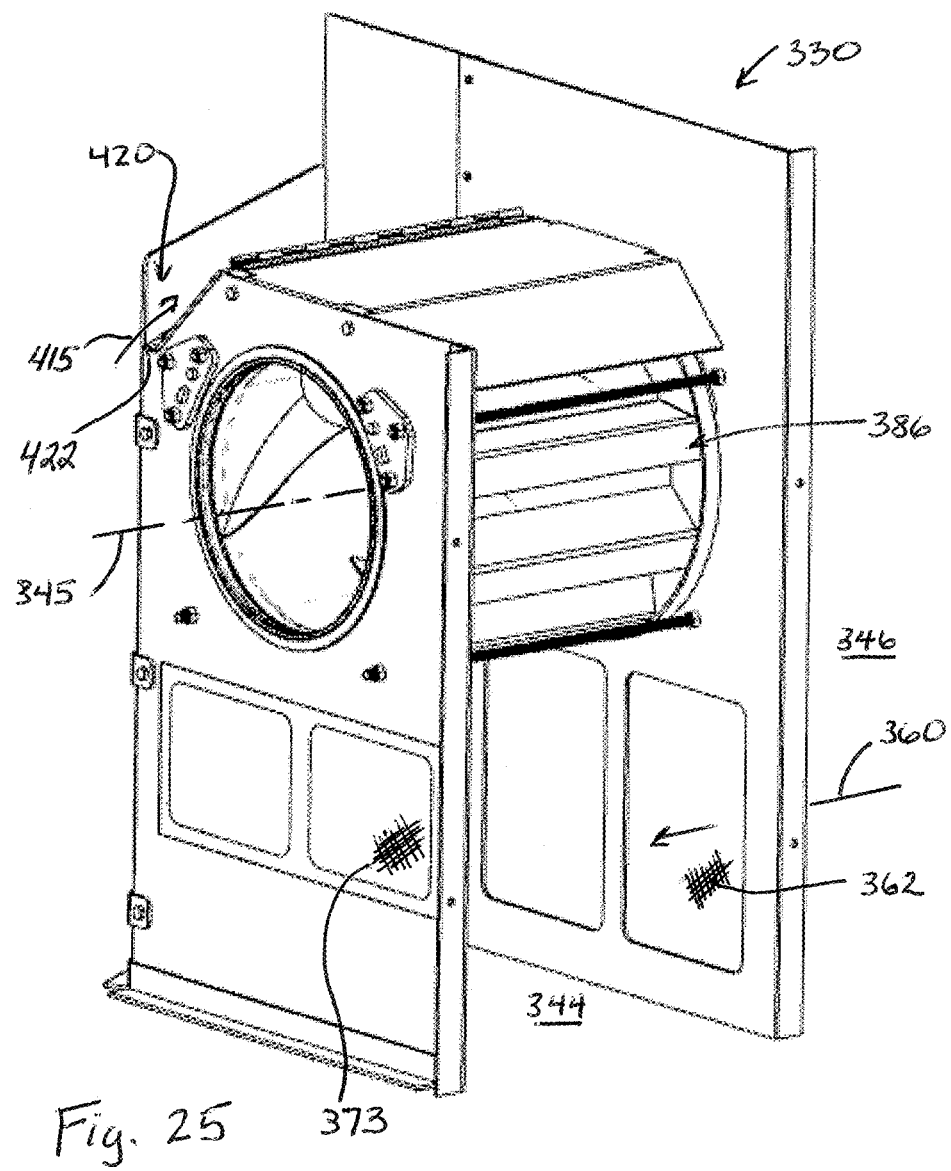
Figure 26:
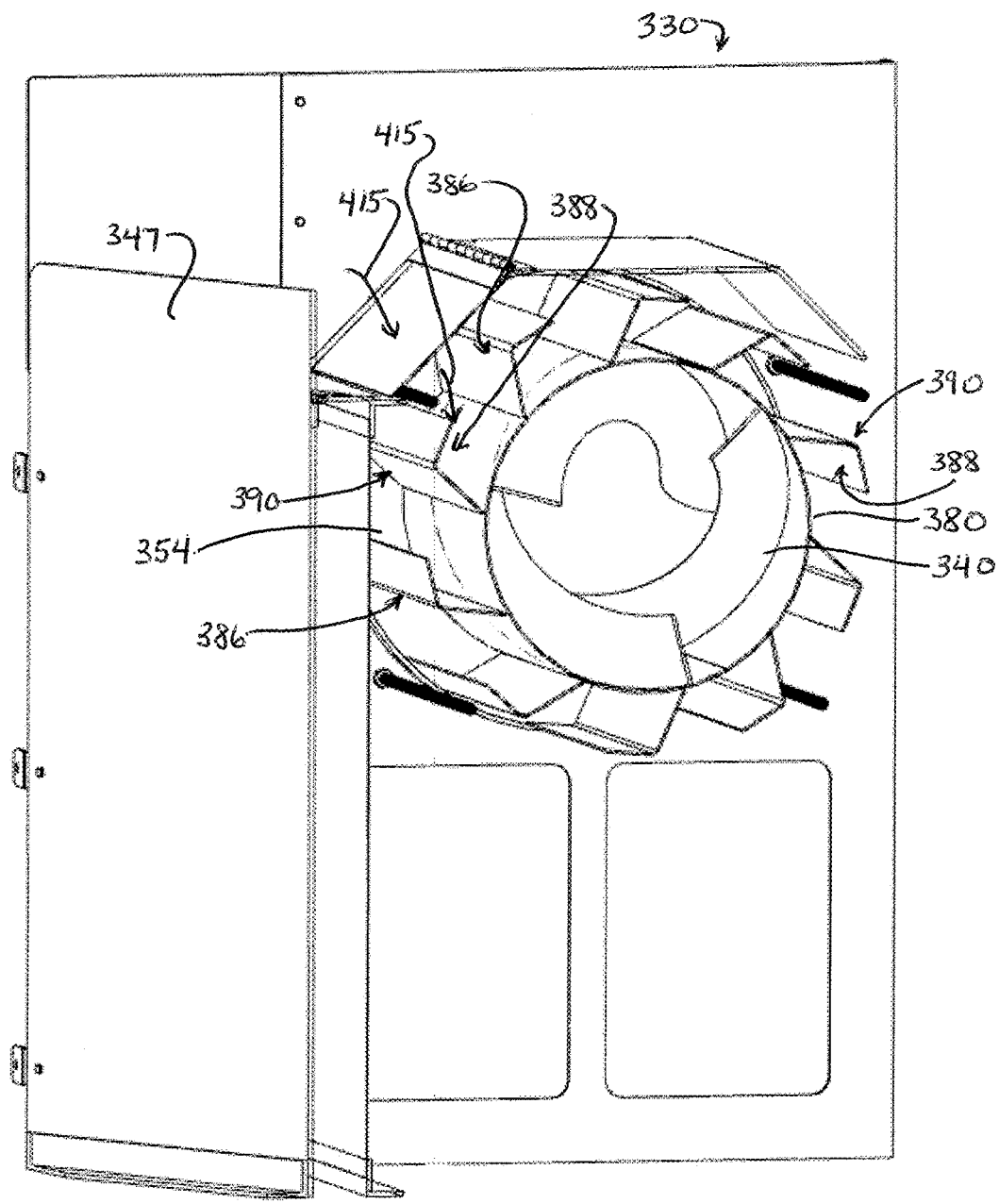
Figure 27:
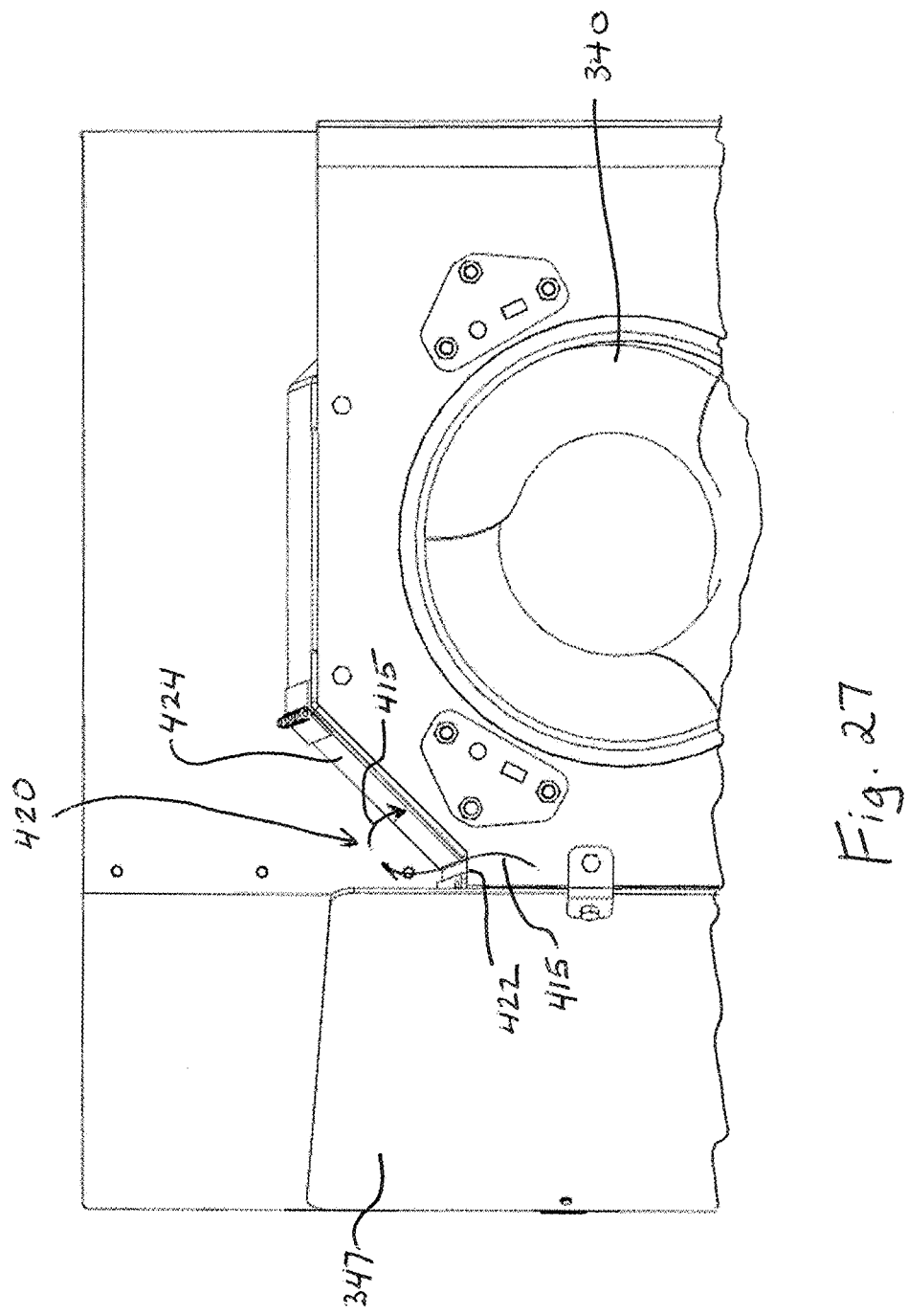

As seen in FIG. 20, a device 210 which includes two (or more) rotatable screen units 230, both having their rotation axes 245 oriented substantially perpendicular to the direction 243 of incoming water flow, is also possible. Here, the rotatable screen units 230 are located in parallel (i.e., parallel flows of water therethrough simultaneously). However, in other embodiments multiple rotatable screen units could be located in series (i.e., water and trash flow axially through a first rotatable screen unit, and then the trash and water that did not pass through the screen structure of the first rotatable screen unit then moves into the next rotatable screen unit.

While the rotatable screen units are primarily shown with rotation axes that run substantially horizontally, embodiments in which the rotation axis runs at an incline from the inlet end to the outlet end, or at a decline from the inlet end to the outlet end, are also contemplated and possible.

The rotatable screen units may incorporate brushes or other sealing mechanisms to seal trash from getting trapped in between the external side of the rotatable screen unit and the walls or wall segments that define the outlet bay.

Referring now to FIGS. 21-27, another embodiment of a stormwater treatment device 310 includes a rectangular or other shape (e.g., cylindrical manhole) tank 312 (e.g., in this case, a concrete vault, though other materials could be used) with an inlet opening 314 and an outlet opening or openings 316 through the tank sidewall 318. In most respects, except as otherwise indicated below, the device 310 includes the features, functions and operating characteristics of the stormwater treatment device 210 described above.

In particular, an inlet pipe 320 connects to opening 314 and an outlet pipe/pipes 322 connect to the opening/openings 316. An insert structure 330 that is configured to control flow through the tank. The tank insert 330 supports a rotatable screen unit 332 within the tank. The rotatable screen unit 332 is barrel-shaped (e.g., cylindrical (round or other), or cylindrical with tapered ends, or conical, or some other circumscribing tubular shape) to define a through path 334 with an inlet end 336 and an outlet end 338. The rotatable screen unit has a tubular screen structure 380 with a plurality of screening openings (not shown) for allowing passage of water therethrough while preventing passage of at least some trash items. The rotatable screen unit 332 includes at least one internal blade 340 (e.g., one, two or more, or three or more, each running helically) within the through path 334 such that water and trash entering the inlet end 336 of the through path interacts with the internal blades 340.

The insert 330 is also configured to define an inlet bay 342, an outlet bay 344 and a trash bay 346. Here, the inlet bay 342 is located around the inlet 314 of the tank and to one side of the inlet, and feeds incoming water to the inlet end 336 of the through path 334. The infeed direction 343 of incoming water is not aligned, or substantially aligned, with the rotation axis 345 of the screen unit 332. Instead, incoming water is deflected by the housing of the insert (e.g., angled housing wall 347), which dissipates energy and protects the rotatable screen unit 332 from large or heavy objects, and diverts objects toward the tank wall 318*a* and away from the screen unit 332. The water then turns to flow into the through path 334, per exemplary flow arrows 349. Thus, the incoming direction 343 of the water flow to the tank 312 is, here, transverse, in particular, perpendicular or substantially perpendicular, to the rotation axis 345. The outlet bay 344 is located for delivering water to the outlet 316 of the tank. The trash bay 346 is located at the outlet end 338 of the rotatable screen unit.

The insert also defines the support housing 352 for the rotatable screen unit 332. Within the support housing, a path or paths 354 are provided at an external surface side of the screen unit 332 for delivering water that passes through the screening openings to the outlet bay 344 without such water passing through the outlet end 338 of the rotatable screen unit 332 into the trash bay 346. Trash items that pass along the through path 334 and out of the outlet end 338 of the rotatable screen unit are captured within the trash bay 346.

The insert 330 also defines a flow path 360 from the trash bay 346 to the outlet bay 344, with a stationary screen unit 362 (aka trash bay screen) located along the flow path to maintain captured trash items with the trash bay. The helical configuration of the internal blades 340, in combination with the rotation of the screen unit 330, pushes trash items along the through path 334 and out of the outlet end 338 of the through path 334 into the trash bay 346.

The frame structure of the screen unit 330 also includes a series of external drive paddles, which here take the form of wide V-shaped trough structures 386, at the external side of the tubular screen structure 380 to form a paddle wheel type structure. Each trough structure has a water flow capture face 388 (here the inside surfaces of the V-shape) and a water flow pass face 390 (here the outside surfaces of the V-shape). The trough structures are oriented so that water flow passing through the tubular screen structure 380 at the side of the path 334 near the tank inlet opening will be partially captured by the water flow capture faces 388, and any water flow passing through the screen structure toward the side of the path near the tank outlet opening will engage with and run off of the water flow pass faces 390. The combined effect is that the screened water that has passed through the tubular screen structure 380 interacts with the trough structures 386, or other form of external drive blades, in a manner to drive the rotation of the screen structure 380.

Thus, as in the case of stormwater treatment device 110, a normal treatment flow path of the stormwater treatment device 310 is configured to permit at least some water that enters the tank 312 through the inlet 314 of the tank to flow into the inlet end 336 of the rotatable screen unit 332 and through the screening openings to reach the outlet 316 of the tank. However, unlike the stormwater treatment device 110, the device 310 includes a bypass treatment flow path (represented by flow arrows 415) configured to permit at least some water that enters the tank 312 through the inlet 314 of the tank to bypass the inlet end 336 of the rotatable screen unit 332 and interact with one or more of the external drive paddles (e.g., 386) to drive rotation of the screen structure 380. Here, this bypass flow path is enabled by a reduced height region 420 of the wall structures making up the insert 330. Once the water level rises to the bottom 422 of the reduced height region 320, the water can move over the upper of part of the insert 330 and then pass downward through a screening device 424 and onto the drive paddles to drive the rotation before moving to the outlet of the tank.

The height of the bottom 422 of the reduced height region 420 and the height of the lower edge of the screening device 424 (here the same) define a bypass height H422 and can vary according to the desired flow characteristics of the device and/or expected treatment conditions to be encountered by the device once installed. In the illustrated embodiment, the rotatable screen unit 332 is oriented for lateral flow into the inlet end 336 and, the bottom 422 is located at an elevation that is above a height of the rotation axis 345 of the rotatable screen unit 332 at the inlet end 336 of the rotatable screen unit 332, and below an upper top edge 336*b* of the inlet end. A vertical spacing between a lower edge 336*a* of the inlet end and the upper edge 336*b* defines an inlet end height, H, of the inlet end 336. In further refinements, the bypass height H422 may be located at or above an elevation that is spaced below the upper edge 336*b* of the inlet end by 0.3 H (e.g., at or above an elevation that is spaced below the upper edge of the inlet end by a distance of 0.2 H, or at or above an elevation that is spaced below the upper edge of the inlet end by a distance of 0.1 H).

In the case of the stormwater treatment device 310, the bypass flow path 415 that drives the external paddles is an initial bypass flow path, and the stormwater treatment device includes a further bypass flow path configured to permit at least some water that enters the tank 312 through the inlet 314 of the tank to bypass the inlet end 336 of the rotatable screen unit 332, without interacting with one or more of the external drive paddles to drive rotation of the screen structure 380, to reach the outlet 316 of the tank. This further bypass flow path (represented by arrow 430) is achieved when the height of the water in the inlet bay 342 reaches the height of the top edge of the wall part 432 of the insert 330 allowing water to move directly into the trash bay 346 and then through the screening device 362 to reach the outlet of the tank.

In the stormwater treatment device 310, a triangular top panel 440 of the insert is also pivotably/hingedly movable (e.g., via hinge 442 that defines the pivot axis) between the illustrated closed position and a raised position that would enable any trash captured below the top panel 440 to be easily removed. A locking mechanism 442 is provided to hold the top panel in the closed/covering position during operation of the stormwater treatment device. The insert housing panel holding the screening device 424 may be similarly pivotable by a hinge arrangement.

A perforated or screened region 373 of the insert may also be provided to permit drain down of the inlet bay 342 under no flow conditions.

It is to be clearly understood that the above description is intended by way of illustration and example only, is not intended to be taken by way of limitation, and that other changes and modifications are possible. The scope of protection of each following claim shall only be limited by features expressly set forth in such claim.

The invention claimed is:

1. A stormwater treatment device, comprising:
a tank defining an internal volume and having an inlet and an outlet;
a rotatable screen unit mounted within the tank, the rotatable screen unit defining a through path with an inlet end and an outlet end, the rotatable screen unit includes a screen structure with a plurality of screening openings for allowing passage of at least some stormwater from the through path outwardly through the screen structure while inhibiting passage of at least some trash items through the screen structure such that the trash items move along the through path from the inlet end to the outlet end, wherein the rotatable screen unit includes a plurality of external drive paddles that rotate with the screen structure;
wherein the stormwater treatment device includes a normal treatment flow path configured to permit at least some stormwater that enters the tank through the inlet of the tank to flow into the inlet end of the rotatable screen unit and through the screening openings to reach the outlet of the tank;
wherein the stormwater treatment device includes a bypass treatment flow path configured to permit at least some stormwater that enters the tank through the inlet of the tank to bypass the inlet end of the rotatable screen unit and interact with one or more of the external drive paddles to drive rotation of the screen structure before the water moves to the outlet of the tank.

2. The stormwater treatment device of claim 1, wherein:
the rotatable screen unit is oriented for lateral flow into the inlet end;
the internal volume includes an inlet bay into which stormwater from the inlet of the tank flows, the inlet bay feeding stormwater to the inlet end of the rotatable screen unit;
in order for stormwater to flow along the bypass flow path to the outlet, a stormwater level in the inlet bay must rise to a bypass height that is above a height of a rotation axis of the rotatable screen unit at the inlet end of the rotatable screen unit.

3. The stormwater treatment device of claim 2, wherein the inlet end of the rotatable screen unit includes a lower edge and an upper edge, a vertical spacing between the lower edge and the upper edge defining an inlet end height, H, of the inlet end, wherein the bypass height is located at or above an elevation that is spaced below the upper edge of the inlet end by a distance of 0.3 H.

4. The stormwater treatment device of claim 2, wherein the inlet end of the rotatable screen unit includes a lower edge and an upper edge, a vertical spacing between the lower edge and the upper edge defining an inlet end height, H, of the inlet end, wherein the bypass height is located at or above an elevation that is spaced below the upper edge of the inlet end by a distance of 0.2 H.

5. The stormwater treatment device of claim 1, wherein the bypass flow path includes a screening device through which the stormwater must pass before interacting with the one or more external drive paddles.

6. The stormwater treatment device of claim 1, wherein the stormwater treatment device includes a further bypass flow path configured to permit at least some stormwater that enters the tank through the inlet of the tank to bypass the inlet end of the rotatable screen unit, without interacting with one or more of the external drive paddles in a manner that drives rotation of the screen structure, to reach the outlet of the tank.

7. The stormwater treatment device of claim 4, wherein the further bypass flow path includes a screening device through which the stormwater must pass before reaching the outlet of the tank.

8. The stormwater treatment device of claim 1, further comprising a housing structure within the tank and configured to support the rotatable screen unit for rotation, the housing structure configured to define an inlet bay into which stormwater from the inlet of the tank flows, the inlet bay feeding stormwater to the inlet end of the rotatable screen unit for flow along the normal treatment flow path, the housing structure further defining a bypass flow level that stormwater in the inlet bay must reach before flowing along the bypass flow path to reach the one or more external drive paddles.

9. A method of treating stormwater, comprising:
flowing stormwater into an inlet of a tank in which a rotatable screen unit is located, the rotatable screen unit shaped to define a through path with an inlet end and an outlet end, the rotatable screen unit having a plurality of screening openings for allowing passage of stormwater therethrough to reach an outlet of the tank while preventing passage of at least some trash items through the screening openings; and
when an elevation of stormwater in the tank reaches a bypass height, flowing at least some stormwater along a bypass flow path that bypasses the inlet end of the rotatable screen unit and directs the stormwater to interact with one or more external drive paddles associated with the rotatable screen unit to drive rotation of the rotatable screen unit before the stormwater moves to the outlet of the tank.

10. The method of claim 9, further comprising:
when an elevation of stormwater in the tank reaches a further bypass height, which is above the bypass height, flowing at least some stormwater along a further bypass flow path that bypasses the inlet end of the rotatable screen unit, and allows the stormwater to proceed to the outlet of the tank without interacting with one or more of the external drive paddles in a manner that drives rotation of the rotatable screen unit.

11. A stormwater treatment device, comprising:
a tank defining an internal volume and having an inlet and an outlet;
a rotatable screen unit mounted within the tank, the rotatable screen unit defining a through path with an inlet end and an outlet end, the rotatable screen unit includes a screen structure with a plurality of screening openings for allowing passage of at least some stormwater from the through path outwardly through the screen structure while inhibiting passage of at least some trash items through the screen structure such that the trash items move along the through path from the inlet end to the outlet end;
wherein the inlet of the tank is oriented for inflow of stormwater into the tank in an infeed direction, wherein a rotation axis of the rotatable screen unit is oriented transverse to the infeed direction;

wherein a wall is located in the tank and configured and positioned such that stormwater flowing in the infeed direction into the tank impinges on the wall to dissipate energy and divert the stormwater toward the inlet end of the rotatable screen unit.

12. The stormwater treatment device of claim 11, wherein the rotation axis of the rotatable screen unit is substantially perpendicular to the infeed direction.

13. The stormwater treatment device of claim 11, wherein the rotation axis of the rotatable screen unit is substantially horizontal.

14. The stormwater treatment device of claim 11, wherein the wall is part of an insert that includes structure that supports the rotatable screen unit.

15. The stormwater treatment device of claim 11, wherein the rotatable screen unit further includes a plurality of internal blades, within the through path, and which rotate with the screen structure, wherein the internal blades are configured to direct at least some stormwater moving along the through path upwardly along the screen structure.

16. The stormwater treatment device of claim 11, wherein the wall is solid and stormwater cannot flow through the wall to reach the inlet end of the rotatable screen unit.

17. The stormwater treatment device of claim 14, wherein the insert is configured to define:
- an inlet bay into which stormwater from the inlet of the tank flows, the inlet bay including the wall and feeding stormwater to the inlet end of the rotatable screen unit;
- an outlet bay for delivering stormwater to the outlet of the tank;
- a trash bay located at the outlet end of the through path for capturing the trash items that move along the through path from the inlet end to the outlet end.

18. The stormwater treatment device of claim 17, wherein the insert further comprises a flow path from the trash bay to the outlet bay, with at least one trash bay screen located along the flow path to maintain captured trash debris within the trash bay while allowing stormwater that enters the trash bay to flow to the outlet bay.

19. The stormwater treatment device of claim 17, wherein the trash bay screen is located at a height to permit stormwater level equalization between the trash bay and the outlet bay during lower flow conditions.

* * * * *